(12) United States Patent
Yamauchi et al.

(10) Patent No.: US 11,799,579 B2
(45) Date of Patent: Oct. 24, 2023

(54) WAVELENGTH CONVERSION DEVICE, TRANSMISSION DEVICE, AND TRANSMISSION SYSTEM

(71) Applicant: FUJITSU LIMITED, Kawasaki (JP)

(72) Inventors: Tomohiro Yamauchi, Kawasaki (JP); Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/526,179

(22) Filed: Nov. 15, 2021

(65) Prior Publication Data

US 2022/0271857 A1 Aug. 25, 2022

(30) Foreign Application Priority Data

Feb. 24, 2021 (JP) ................. 2021-027359

(51) Int. Cl.
*H04J 14/02* (2006.01)
*G02F 1/35* (2006.01)
*H04B 10/2507* (2013.01)
*H04B 10/572* (2013.01)
*H04B 10/60* (2013.01)
(Continued)

(52) U.S. Cl.
CPC ............ *H04J 14/02* (2013.01); *G02F 1/3536* (2013.01); *G02F 1/365* (2013.01); *H04B 10/2507* (2013.01); *H04B 10/572* (2013.01); *H04B 10/60* (2013.01); *H04B 10/07* (2013.01); *H04B 10/29* (2013.01); *H04B 10/50* (2013.01); *H04Q 2011/0011* (2013.01)

(58) Field of Classification Search
CPC .... H04J 14/02; H04J 14/0256; H04J 14/0275; G02F 1/3536; G02F 1/365; H04B 10/2507; H04B 10/572; H04B 10/60; H04B 10/671; H04B 10/07; H04B 10/29; H04B 10/50; H04Q 2011/0011

USPC ................. 398/9–38, 43–103, 182–202
See application file for complete search history.

(56) References Cited

U.S. PATENT DOCUMENTS 5,894,362 A * 4/1999 Onaka ............... H04B 10/564
398/94
6,078,414 A * 6/2000 Iwano ............... H04B 10/572
398/1
(Continued)

FOREIGN PATENT DOCUMENTS

EP        1 008 898 A1    6/2000
JP        2000-81643      3/2000
JP        2001-318395    11/2001

*Primary Examiner* — Dibson J Sanchez
(74) *Attorney, Agent, or Firm* — STAAS & HALSEY LLP

(57) ABSTRACT

A wavelength conversion device includes: a first wavelength conversion circuit that wavelength-converts, by passing first multiplex light obtained by multiplexing an optical signal of a first wavelength band from each transmitter through an inside of a wavelength conversion medium by using excitation light, the first multiplex light into second multiplex light in a second wavelength band different from the first wavelength band; and a first generation circuit that generates a first control signal that controls each transmitter to shift a signal wavelength of each optical signal in the first multiplex light before wavelength conversion according to a subsequent part to which the second multiplex light after wavelength conversion in the first wavelength conversion circuit is input, and transmits the first control signal to each transmitter.

11 Claims, 28 Drawing Sheets

(51) Int. Cl.
*G02F 1/365* (2006.01)
*H04B 10/29* (2013.01)
*H04B 10/07* (2013.01)
*H04Q 11/00* (2006.01)
*H04B 10/50* (2013.01)

(56) References Cited

U.S. PATENT DOCUMENTS

| | | | | |
|---|---|---|---|---|
| 6,115,173 | A * | 9/2000 | Tanaka | H04B 10/2935 359/341.1 |
| 6,831,775 | B2 * | 12/2004 | Matsushita | G02F 2/004 359/326 |
| 2002/0003655 | A1 * | 1/2002 | Park | H01S 3/06754 359/341.1 |
| 2003/0152388 | A1 * | 8/2003 | Uda | H04J 14/02 398/97 |
| 2004/0047020 | A1 * | 3/2004 | Islam | H04B 10/2935 359/233 |
| 2006/0216027 | A1 * | 9/2006 | Izumi | H04J 14/0216 398/79 |
| 2010/0134868 | A1 * | 6/2010 | Okuno | G02F 1/365 359/290 |
| 2011/0292953 | A1 * | 12/2011 | Liu | H01S 5/06256 372/20 |
| 2011/0293273 | A1 * | 12/2011 | Futami | G02F 1/3513 398/48 |
| 2014/0314415 | A1 * | 10/2014 | Vassilieva | H04J 14/0227 398/76 |
| 2019/0115993 | A1 * | 4/2019 | Mori | H04J 14/0275 |
| 2019/0146306 | A1 * | 5/2019 | Mori | H04J 14/02 359/326 |
| 2019/0305852 | A1 * | 10/2019 | Kato | H04B 10/6166 |
| 2019/0346738 | A1 * | 11/2019 | Takeyama | G02F 1/395 |
| 2019/0349113 | A1 * | 11/2019 | Komiya | H04J 14/0221 |
| 2019/0379461 | A1 * | 12/2019 | Irie | H04B 10/572 |
| 2019/0386767 | A1 * | 12/2019 | Yuki | H04B 10/572 |
| 2020/0059313 | A1 * | 2/2020 | Kato | H04B 10/27 |
| 2021/0405502 | A1 * | 12/2021 | Umeki | G02F 1/3558 |

* cited by examiner

FIG. 4A

| ZERO DISPERSION WAVELENGTH (nm) | C-BAND SHORTEST WAVELENGTH (nm) | C-BAND LONGEST WAVELENGTH (nm) |
|---|---|---|
| 1566.72 | 1528.58 | 1557.16 |
| 1568.36 | 1530.92 | 1559.59 |
| 1570 | 1533.27 | 1562.03 |

FIG. 4B

| CH NUMBER | ZERO DISPERSION WAVELENGTH 1566.72 nm | ZERO DISPERSION WAVELENGTH 1568.36 nm | ZERO DISPERSION WAVELENGTH 1570.00 nm |
|---|---|---|---|
| CH1 | 1528.58 | 1530.92 | 1533.27 |
| ... | ... | ... | ... |
| CH72 | 1557.16 | 1559.59 | 1562.03 |

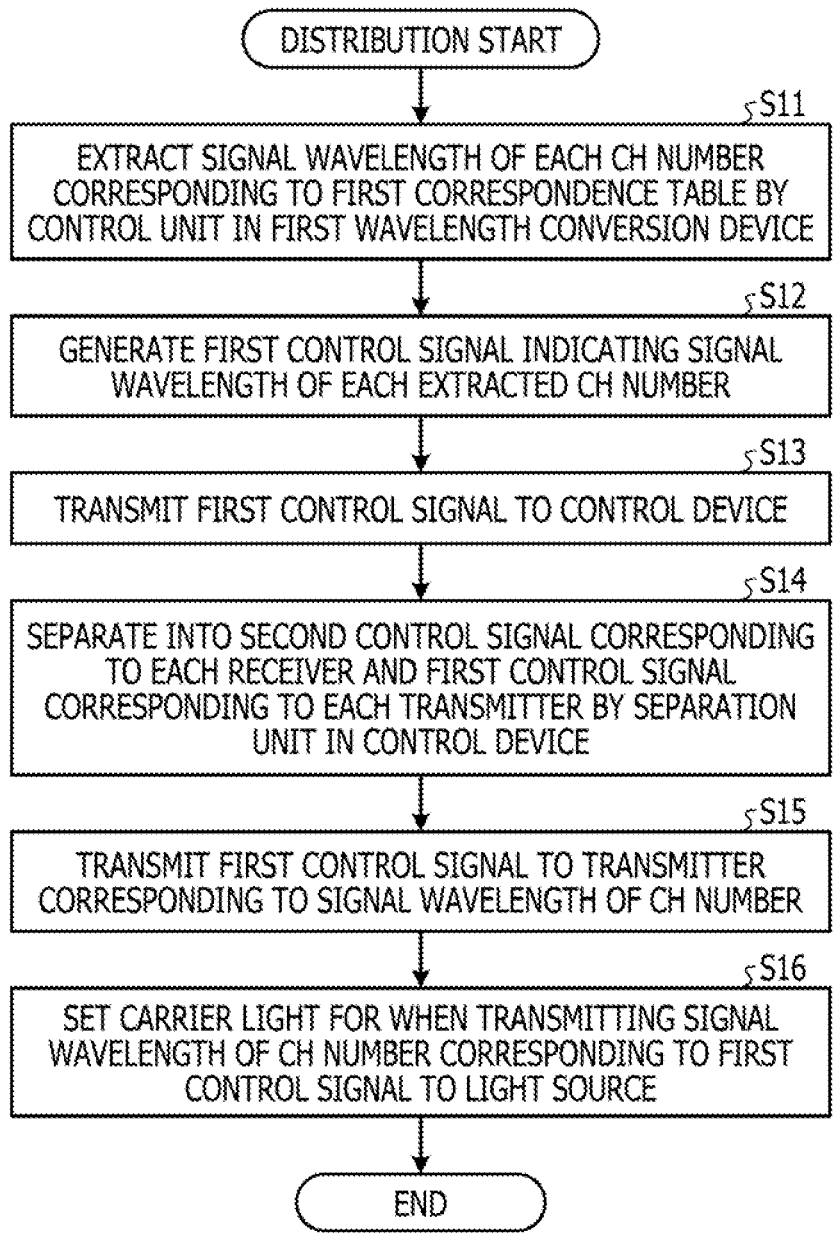

FIG. 14

| ZERO DISPERSION WAVELENGTH AT TIME OF 25(C) (nm) | EXCITATION WAVELENGTH (nm) | SET TEMPERATURE (C) |
|---|---|---|
| 1566.4 | 1566.7 | 35 |

WAVELENGTH CONVERSION DEVICE, TRANSMISSION DEVICE, AND TRANSMISSION SYSTEM

CROSS-REFERENCE TO RELATED APPLICATION

This application is based upon and claims the benefit of priority of the prior Japanese Patent Application No. 2021-27359, filed on Feb. 24, 2021, the entire contents of which are incorporated herein by reference.

FIELD

The embodiments discussed herein are related to a wavelength conversion device, a transmission device, and a transmission system.

BACKGROUND

In recent years, with the expansion of communication demand, for example, a transmission capacity has been expanded by increasing the number of optical fiber cores, increasing an optical signal capacity per wavelength, and increasing the number of wavelength divisional multiplex (WDM) channels.

However, since laying cost or the like of the optical fiber is high, it is required to increase the transmission capacity without increasing the number of optical fiber cores. Therefore, transmission devices are required to increase the transmission capacity by increasing the optical signal capacity and the number of WDM channels. However, there is a limit to the conventional expansion of the transmission capacity only by a communication band, for example, a conventional (C) band, and in order to further expand the transmission capacity, it is necessary to use not only the C band but also a long (L) band of a long wavelength region L and a short (S) band of a short wavelength region.

However, for example, it is necessary to individually develop optical parts such as optical transceivers in the S band and L band, wavelength multiplexer-demultiplexer, and optical amplifiers, and as compared to transmission devices using only optical parts of the C band, transmission devices using optical parts of the L band and S band are more expensive. Accordingly, by using a wavelength conversion device, large-capacity transmission is made possible with a transmission device using the C-band optical parts.

That is, the wavelength conversion device enables large-capacity transmission by wavelength-conversion of an optical signal in the C band into an L band or optical signal in the S band while using the C-band optical parts. However, since yield of a highly non-linear fiber used for wavelength conversion of the wavelength conversion device has not been taken into consideration, dispersion in zero dispersion wavelength of the highly non-linear fiber becomes a problem at the stage of commercializing a wavelength conversion technique.

For example, the wavelength conversion device wavelength-converts a wavelength band used by the C-band optical parts in the entire wavelength of the C band into a wavelength band of the L-band optical parts according to excitation light. However, the actual situation is that, in the current wavelength conversion device, even when the zero dispersion wavelength and the excitation light wavelength are matched, the wavelength conversion of the entire wavelength of the C band to the entire wavelength of the L band is not possible.

FIG. 20 is an explanatory diagram illustrating one example of performing wavelength conversion of the wavelength band of the C-band optical parts into the wavelength band of the L-band optical parts, for each excitation light. Note that there are dispersions in the zero dispersion wavelength of the highly non-linear fiber. Since the wavelength conversion device has dispersions in the zero dispersion wavelength even when the zero dispersion wavelength and the excitation light wavelength are matched, excitation light of $\lambda 11$ is used to convert the wavelength band of the C band of 50 GHz interval×72 ch into the wavelength band of the converted light of the L band by the excitation light of $\lambda 11$. Furthermore, the wavelength conversion device uses excitation light of $\lambda 12$ to wavelength-convert the wavelength band of the C band of 50 GHz interval×72 ch into the wavelength band of converted light of the L band by the excitation light of $\lambda 12$. Furthermore, the wavelength conversion device uses excitation light of $\lambda 13$ to convert the wavelength band of the C band of 50 GHz interval×72 ch into the wavelength band of converted light of the L band by the excitation light of $\lambda 13$.

That is, in the wavelength conversion device, the wavelength band of the converted light of the L band for each excitation light is different due to dispersions in the excitation light due to the dispersions in the zero dispersion wavelength. However, in the optical amplifier subsequent to the wavelength conversion device, since an amplified wavelength bandwidth of the converted light after wavelength conversion is fixed, there may be a band that cannot be amplified depending on fluctuation of the wavelength band of the converted light for each excitation light. Accordingly, for the wavelength conversion device, there is a method of controlling the excitation light so as to match the zero dispersion wavelength of the highly non-linear fiber.

Examples of the related art include as follows: Japanese Laid-open Patent Publication No. 2001-318395; and Japanese Laid-open Patent Publication No. 2000-81643.

SUMMARY

According to an aspect of the embodiments, there is provided a wavelength conversion device including: a first wavelength conversion circuit that wavelength-converts, by passing first multiplex light obtained by multiplexing an optical signal of a first wavelength band from each transmitter through an inside of a wavelength conversion medium by using excitation light, the first multiplex light into second multiplex light in a second wavelength band different from the first wavelength band; and a first generation circuit that generates a first control signal that controls each transmitter to shift a signal wavelength of each optical signal in the first multiplex light before wavelength conversion according to a subsequent part to which the second multiplex light after wavelength conversion in the first wavelength conversion circuit is input, and transmits the first control signal to each transmitter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is an explanatory diagram illustrating one example of a table for managing a wavelength range of a C band for each zero dispersion wavelength;

FIG. 4B is an explanatory diagram illustrating one example of a first correspondence table;

FIG. 9 is a flowchart illustrating one example of processing operation of the WDM system related to distribution processing;

FIG. 14 is an explanatory diagram illustrating one example of a second correspondence table in which an excitation light wavelength at the time of a set temperature is managed for each zero dispersion wavelength at the time of a reference temperature;

DESCRIPTION OF EMBODIMENTS

Figure 21:
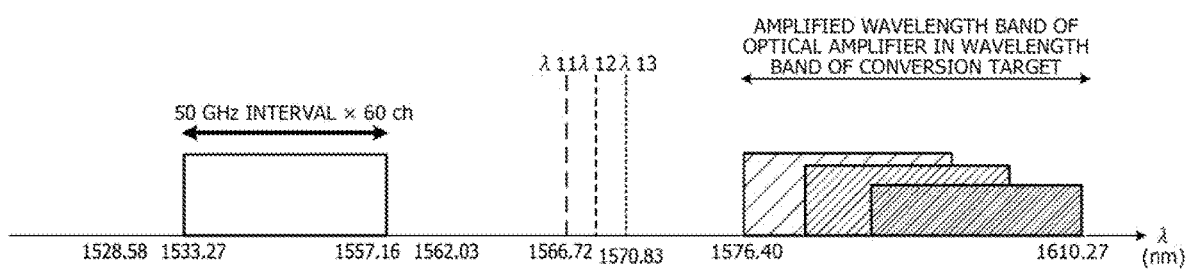
FIG. 21 is an explanatory diagram illustrating one example in which the number of signal wavelengths of the converted light is reduced so as to fit within the amplified wavelength band of the optical amplifier.

However, in the conventional wavelength conversion device, it is conceivable to control the excitation light wavelength so as to match the zero dispersion wavelength, but since the dispersions in the zero dispersion wavelength of the highly non-linear fiber is large, the converted light does not fit within the amplified wavelength bandwidth of the optical amplifier in the L band that is a subsequent part. FIG. 21 is an explanatory diagram illustrating one example in which the number of signal wavelengths of the converted light is reduced so as to fit in the amplified wavelength bandwidth of the optical amplifier. Then, as illustrated in FIG. 21, when the converted light after wavelength conversion fits within the amplified wavelength band of the optical amplifier, for example, the number of signal wavelengths in the wavelength band of C band is reduced from 50 GHz interval×72 ch to 60 ch. That is, when the zero dispersion wavelength of the highly non-linear fiber varies, the number of signal wavelengths is reduced in order to comply with subsequent part characteristics after wavelength conversion.

In one aspect, it is an object to provide a wavelength conversion device or the like that increases the number of signal wavelengths while corresponding to subsequent part characteristics after wavelength conversion even when there are dispersions in the zero dispersion wavelength of a highly non-linear fiber.

Hereinafter, embodiments of a wavelength conversion device and the like disclosed in the present application will be described in detail with reference to the drawings. Note that the disclosed technology is not limited by each of the embodiments. Furthermore, each embodiment to be described below may be combined as appropriate, without causing inconsistency.

First Embodiment

Figure 1A:
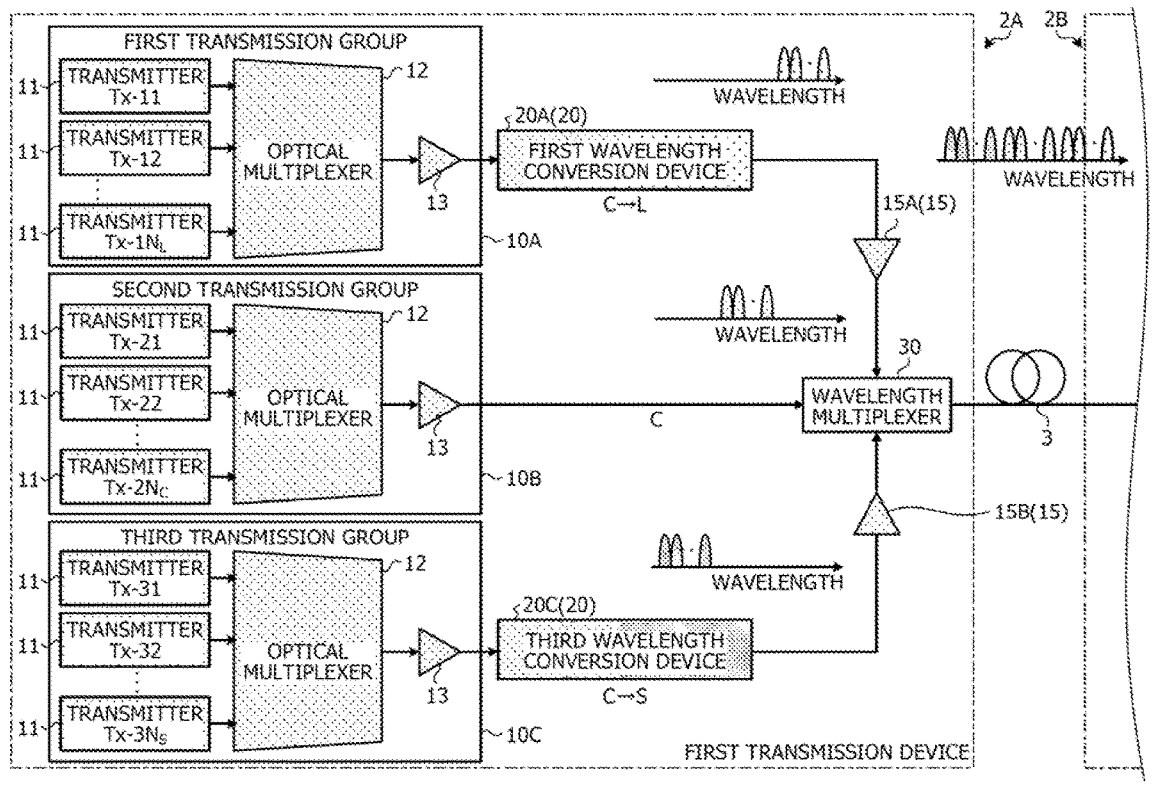
FIGS. 1A and 1B is an explanatory diagram illustrating one example of a WDM system of a present embodiment.
Figure 1B:
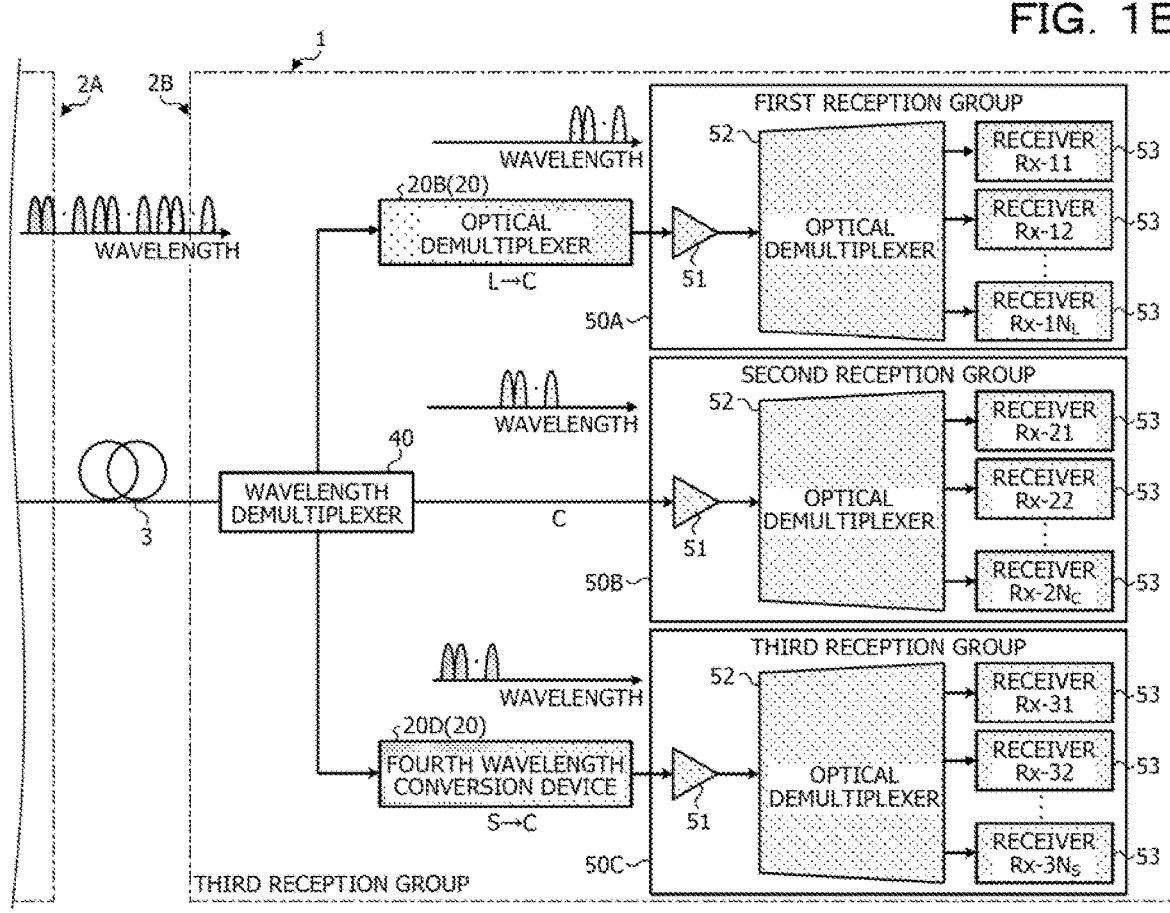

FIG. 1 (i.e., FIGS. 1A and 1B) is an explanatory diagram illustrating one example of a WDM system 1 of the present embodiment. The wavelength division multiplexing (WDM) system 1 illustrated in FIG. 1 includes a first transmission device 2A, a second transmission device 2B, and a transmission line 3 such as an optical fiber that connects between the first transmission device 2A and the second transmission device 2B. The WDM system 1 is a multi-band system that transmits multiplex light (WDM light) of different wavelength bands, for example, C band, L band, and S band.

The first transmission device 2A has a first transmission group 10A, a second transmission group 10B, a third transmission group 10C, a first wavelength conversion device 20A (20), and a third wavelength conversion device 20C (20). Moreover, the first transmission device 2A has a first optical amplifier 15A (15), a second optical amplifier 15B (15), and a wavelength multiplexer 30. The first transmission group 10A has a plurality of C-band transmitters 11, an optical multiplexer 12, and an optical amplifier 13. The transmitter 11 outputs optical signals having different signal wavelengths in the C band to the optical multiplexer 12. The optical multiplexer 12 multiplexes the optical signals from respective transmitters 11 and outputs first WDM light in the C band to the optical amplifier 13. Note that the optical amplifier 13 is, for example, an erbium doped optical fiber amplifier (EDFA). The optical amplifier 13 optically amplifies the first WDM light and outputs the first WDM light in the C band after optical amplification to the first wavelength conversion device 20A.

The second transmission group 10B has a plurality of C-band transmitters 11, an optical multiplexer 12, and an optical amplifier 13. The transmitter 11 outputs optical signals having different signal wavelengths in the C band to the optical multiplexer 12. The optical multiplexer 12 multiplexes the optical signals from respective transmitters 11 and outputs first WDM light in the C band to the optical amplifier 13. The optical amplifier 13 optically amplifies the first WDM light and outputs the first WDM light in the C band after optical amplification to the wavelength multiplexer 30.

The third transmission group 10C has a plurality of C-band transmitters 11, an optical multiplexer 12, and an optical amplifier 13. The transmitter 11 outputs optical signals having different signal wavelengths in the C band to the optical multiplexer 12. The optical multiplexer 12 multiplexes the optical signals from respective transmitters 11 and outputs first WDM light in the C band to the optical amplifier 13. The optical amplifier 13 optically amplifies the first WDM light and outputs the first WDM light in the C band after optical amplification to the third wavelength conversion device 20C. Note that the first transmission group 10A, the second transmission group 10B, and the third transmission group 10C incorporate the optical amplifier 13, but the optical amplifier 13 is not necessary when the first WDM light from the optical multiplexer 12 can obtain sufficient power, and the installation thereof can be changed as appropriate.

The first wavelength conversion device 20A is a wavelength conversion device of a reduced four-wave mixing method that wavelength-converts the first WDM light in the C band from the first transmission group 10A into second WDM light in the L band using excitation light. The first wavelength conversion device 20A outputs the second WDM light in the L band after wavelength conversion to the first optical amplifier 15A. The first optical amplifier 15A optically amplifies the second WDM light in the L band, and outputs the second WDM light in the L band after optical amplification to the wavelength multiplexer 30. Note that the wavelength amplification bandwidth of the first optical amplifier 15A is a predetermined bandwidth.

The third wavelength conversion device 20C is a wavelength conversion device of a reduced four-wave mixing method that wavelength-converts the first WDM light in the C band from the third transmission group 10C into third WDM light in the S band using excitation light. The third wavelength conversion device 20C outputs the third WDM light in the S band after wavelength conversion to the second optical amplifier 15B. The second optical amplifier 15B optically amplifies the third WDM light in the S band, and outputs the third WDM light in the S band after optical amplification to the wavelength multiplexer 30. Note that the wavelength bandwidth of the second optical amplifier 15B is a predetermined bandwidth.

The wavelength multiplexer 30 multiplexes the first WDM light in the C band from the second transmission group 10B, the second WDM light in the L band from the first wavelength conversion device 20A, and the third WDM light in the S band from the third wavelength conversion device 20C, and outputs the first to third WDM light to the transmission line 3.

The second transmission device 2B has a wavelength demultiplexer 40, a second wavelength conversion device 20B (20), a fourth wavelength conversion device 20D (20), a first reception group 50A, a second reception group 50B, and a third reception group 50C. The wavelength demultiplexer 40 demultiplexes the WDM light received from the transmission line 3 into the first WDM light in the C band, the second WDM light in the L band, and the third WDM light in the S band. The wavelength demultiplexer 40 outputs the first WDM light to the second reception group 50B, outputs the second WDM light to the second wavelength conversion device 20B, and outputs the third WDM light to the fourth wavelength conversion device 20D.

The second reception group 50B has an optical amplifier 51, an optical demultiplexer 52, and a plurality of receivers 53. The optical amplifier 51 optically amplifies the first WDM light in the C band from the wavelength demultiplexer 40, and outputs the first WDM light after optical amplification to the optical demultiplexer 52. Note that the optical amplifier 51 is, for example, an erbium doped optical fiber amplifier (EDFA). The optical demultiplexer 52 demultiplexes the first WDM light into optical signals in the C band in wavelength units, and outputs the optical signals to respective receivers 53.

The second wavelength conversion device 20B wavelength-converts the second WDM light in the L band from the wavelength demultiplexer 40 into the first WDM light in the C band by using excitation light, and outputs the first WDM light in the C band after wavelength conversion to the first reception group 50A. The first reception group 50A has an optical amplifier 51, an optical demultiplexer 52, and a plurality of receivers 53. The optical amplifier 51 optically amplifies the first WDM light in the C band after wavelength conversion from the second wavelength conversion device 20B, and outputs the first WDM light after optical amplification to the optical demultiplexer 52. The optical demultiplexer 52 demultiplexes the first WDM light into optical signals in the C band in units of signal wavelength, and outputs the optical signals to respective receivers 53. Note that the transmitter 11 in the first transmission group 10A uses any signal wavelength of the C band for each transmitter 11 to communicate with the receiver 53 of the signal wavelength of the CH number corresponding to the transmitter 11 among the plurality of receivers 53 in the first reception group 50A. For example, the transmitter 11 of Tx-11 in the first transmission group 10A and the receiver 53 of Rx-12 in the first reception group 50A use the same signal wavelength of CH number C1, and the transmitter 11 of Tx-11 transmits an optical signal having the same signal wavelength as the receiver 53 of the Rx-12. Similarly, the transmitter 11 in the second transmission group 10B also uses any signal wavelength of the CH number for each transmitter 11 to communicate with the receiver 53 with the CH number corresponding to the transmitter 11 among the plurality of receivers 53 in the second reception group 50B. That is, the transmitter 11 and the receiver 53 are in a communication pair relationship using the signal wavelength of the same CH number.

The fourth wavelength conversion device 20D wavelength-converts the third WDM light in the S band from the wavelength demultiplexer 40 into the first WDM light in the C band by using excitation light, and the first WDM light of the C band after wavelength conversion is output to the third reception group 50C. The third reception group 50C has an optical amplifier 51, an optical demultiplexer 52, and a plurality of receivers 53. The optical amplifier 51 optically amplifies the first WDM light in the C band after wavelength conversion from the fourth wavelength conversion device 20D, and outputs the first WDM light after optical amplification to the optical demultiplexer 52. The optical demultiplexer 52 demultiplexes the first WDM light into optical signals in the C band in units of signal wavelength, and outputs the optical signals to respective receivers 53. The transmitter 11 in the third transmission group 10C also uses any signal wavelength of the C band for each transmitter 11 to communicate with the receiver 53 of the CH number corresponding to the transmitter 11 among the plurality of receivers 53 in the third reception group 50C. For example, the transmitter 11 of Tx-32 in the third transmission group 10C and the receiver 53 of Rx-31 in the third reception group 50C use an optical signal having the signal wavelength of the same CH number C2, and the transmitter 11 of Tx-31 transmits an optical signal having the same signal wavelength as the receiver 53 of Rx-32. That is, the transmitter 11 and the receiver 53 are in a communication pair relationship using the signal wavelength of the same CH number.

Figure 2:
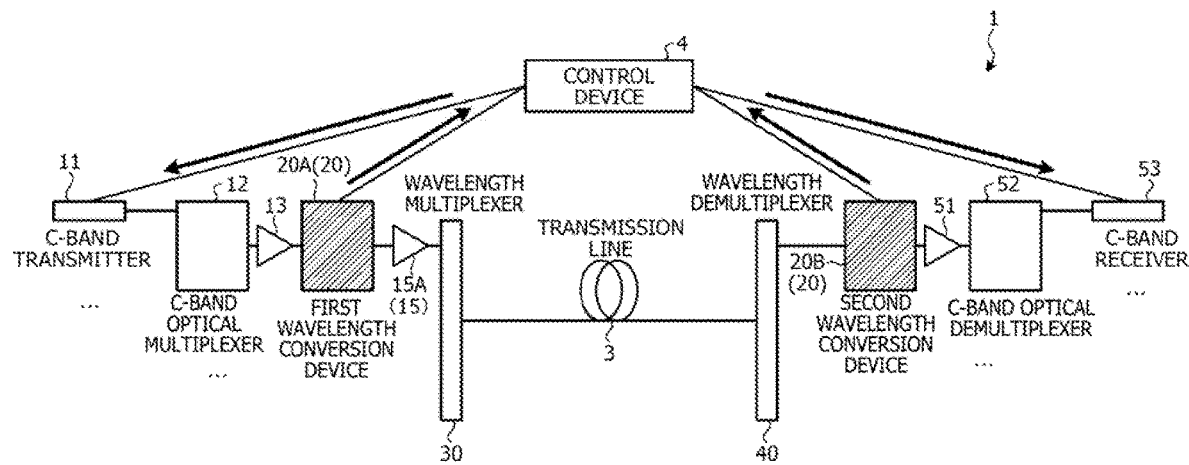
FIG. 2 is an explanatory diagram illustrating one example of a method for distributing a first control signal and a second control signal in a WDM system of a first embodiment.

FIG. 2 is an explanatory diagram illustrating one example of a method for distributing a first control signal and a second control signal in the WDM system 1 of the first embodiment. Note that the WDM system 1 illustrated in FIG. 2 is an explanatory diagram in which a part of the WDM system 1 illustrated in FIG. 1 is omitted. The WDM system 1 illustrated in FIG. 2 has a control device 4 that monitors and controls the first transmission device 2A and the second transmission device 2B. It is assumed that the control device 4 transmits the first control signal and the second control signal between the first transmission device 2A and the second transmission device 2B by using a communication line different from the communication channel. Note that the communication line may transmit a control signal by telecommunication or optical communication. Furthermore, the control signal may be transmitted using an optical supervisory channel (OSC).

The first transmission device 2A includes the transmitters 11, the optical multiplexer 12, the optical amplifier 13, the first wavelength conversion device 20A, the optical amplifier 15 (15A, 15B), and the wavelength multiplexer 30. The second transmission device 2B includes the wavelength demultiplexer 40, the second wavelength conversion device 20B, the optical amplifier 51, the optical demultiplexer 52, and the receivers 53.

The first wavelength conversion device 20A generates the first control signal including the signal wavelength of each transmitter 11 shifted by the excitation light corresponding to a zero dispersion wavelength of a highly non-linear fiber, and transmits the first control signal to the control device 4. The control device 4 manages the signal wavelength used by each of the transmitters 11 and the receivers 53. When the control device 4 receives the first control signal from the first wavelength conversion device 20A, the control device 4 separates the signal wavelength of each transmitter 11 in the first control signal and transmits the first control signal including the signal wavelength after shift to the transmitter 11 corresponding to the signal wavelength.

The second wavelength conversion device 20B generates a second control signal including the signal wavelength of each receiver 53 shifted by the excitation light corresponding to the zero dispersion wavelength of the highly non-linear fiber, and transmits the second control signal to the control device 4. When the control device 4 receives the second control signal, the control device 4 separates the signal wavelength for each receiver 53 in the second control signal, and transmits the second control signal including the signal wavelength after shift corresponding to the signal wavelength with respect to the receiver 53 corresponding to the signal wavelength.

When each transmitter 11 receives the first control signal from the control device 4, each transmitter 11 sets carrier light corresponding to the signal wavelength to the light source 11D, in order to transmit an optical signal having a signal wavelength in the first control signal. Furthermore, when each receiver 53 receives the second control signal from the control device 4, each receiver 53 sets reference light corresponding to the signal wavelength to the light source 53B, in order to receive an optical signal having the signal wavelength in the second control signal.

Figure 3:
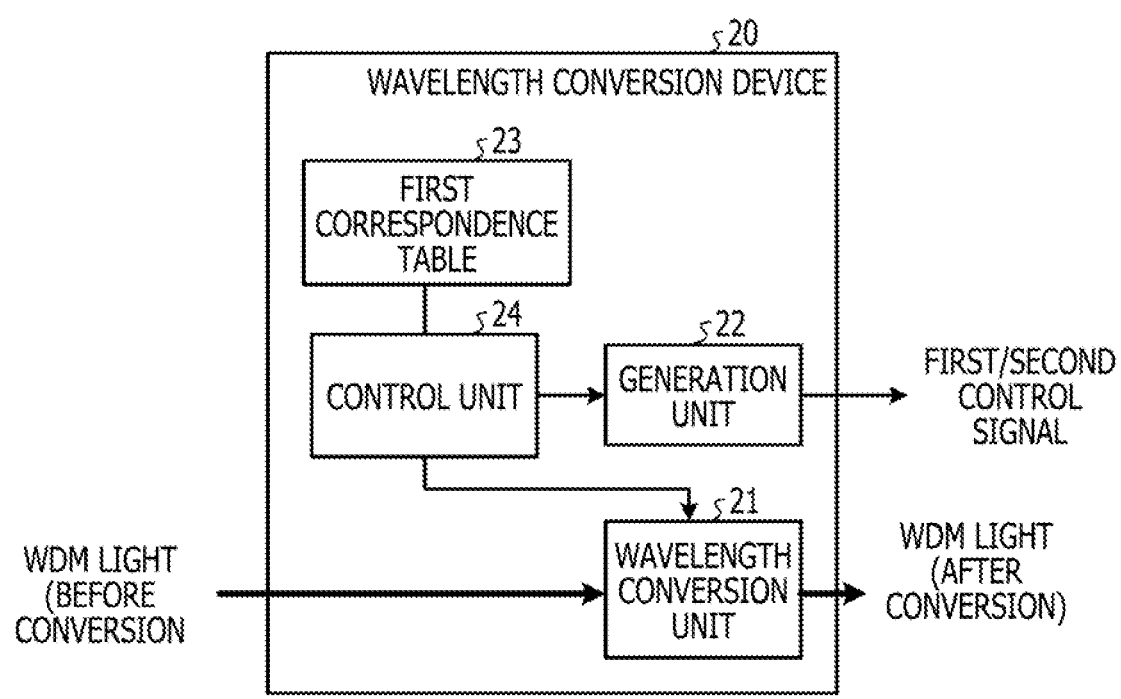
FIG. 3 is an explanatory diagram illustrating one example of a wavelength conversion device.

FIG. 3 is an explanatory diagram illustrating one example of the wavelength conversion device 20. The wavelength conversion device 20 illustrated in FIG. 3 includes a wavelength conversion unit 21, a generation unit 22, a first correspondence table 23, and a control unit 24. The wavelength conversion unit 21 is composed of a wavelength conversion medium such as a highly non-linear fiber, and for example, using excitation light, WDM light in the C band obtained by multiplexing the optical signals from the respective transmitters 11 by the optical multiplexer 12 is wavelength-converted into WDM light in the L band. The first correspondence table 23 is a storage area for storing the signal wavelength of each CH number for each zero dispersion wavelength of the highly non-linear fiber in the wavelength conversion unit 21.

It is assumed that the wavelength conversion device 20 is the first wavelength conversion device 20A. In this case, in the wavelength conversion unit 21, the WDM light in the C band, which is first multiplex light obtained by multiplexing the optical signal in the C band, which is the first wavelength band, from each transmitter 11 by using the excitation light that matches the zero dispersion wavelength of the highly non-linear fiber, passes through an inside of the highly non-linear fiber. The wavelength conversion unit 21 wavelength-converts the WDM light in the C band into the WDM light in the L band by passing the WDM light in the C band through the inside of the highly non-linear fiber. The generation unit 22 generates the first control signal to control each transmitter 11 to shift the signal wavelength of each optical signal in the WDM light in the C band so that the second WDM light in the L band after wavelength conversion falls within the amplified wavelength band of the first optical amplifier 15A. Moreover, the generation unit 22 transmits the first control signal to each transmitter 11 via the control device 4.

It is assumed that the wavelength conversion device 20 is the second wavelength conversion device 20B. In this case, the wavelength conversion unit 21 uses the excitation light that matches the zero dispersion wavelength of the highly non-linear fiber, and the WDM light in the L band from the second wavelength conversion device 20B passes through the inside of the highly non-linear fiber. The wavelength conversion unit 21 wavelength-converts the WDM light in the L band into the WDM light in the C band by passing the WDM light in the L band through the inside of the highly non-linear fiber. The generation unit 22 generates the second control signal to control each receiver 53 to shift the signal wavelength of the optical signal to be received by each receiver 53 in the WDM light of the C band after wavelength conversion according to the zero dispersion wavelength of the highly non-linear fiber. The generation unit 22 transmits the second control signal to each receiver 53 via the control device 4.

FIG. 4A is an explanatory diagram illustrating one example of a table that manages the wavelength range of the C band for each zero dispersion wavelength. The table illustrated in FIG. 4A is a part of the first correspondence table 23 that manages the wavelength range of the C band including the shortest wavelength of the C band and the longest wavelength of the C band for each zero dispersion wavelength of the highly non-linear fiber in the wavelength conversion device 20. The control unit 24 in the wavelength conversion device 20 refers to the table illustrated in FIG. 4A and recognizes the shortest wavelength in the C band and the longest wavelength in the C band corresponding to the zero dispersion wavelength of the highly non-linear fiber.

FIG. 4B is an explanatory diagram illustrating one example of the first correspondence table 23. The first correspondence table 23 illustrated in FIG. 4B is a table that manages the signal wavelength for each CH number within the wavelength range of the C band for each zero dispersion wavelength of the highly non-linear fiber in the wavelength conversion device 20. Note that for convenience of explanation, CHs of the wavelength band of the C band are 72 channels at intervals of 50 GHz, and as the zero dispersion wavelength of the highly non-linear fiber, for example, 1566.72 nm, 1568.36 nm, and 1570.00 nm are exemplified. The control unit 24 identifies the zero dispersion wavelength of the highly non-linear fiber, refers to the first correspondence table 23, and acquires the signal wavelength of each channel for each CH number in the C band when the zero dispersion wavelength is used as the excitation light. The generation unit 22 generates, for example, the first control signal including a signal wavelength for each CH number corresponding to a zero dispersion wavelength.

Figure 5:
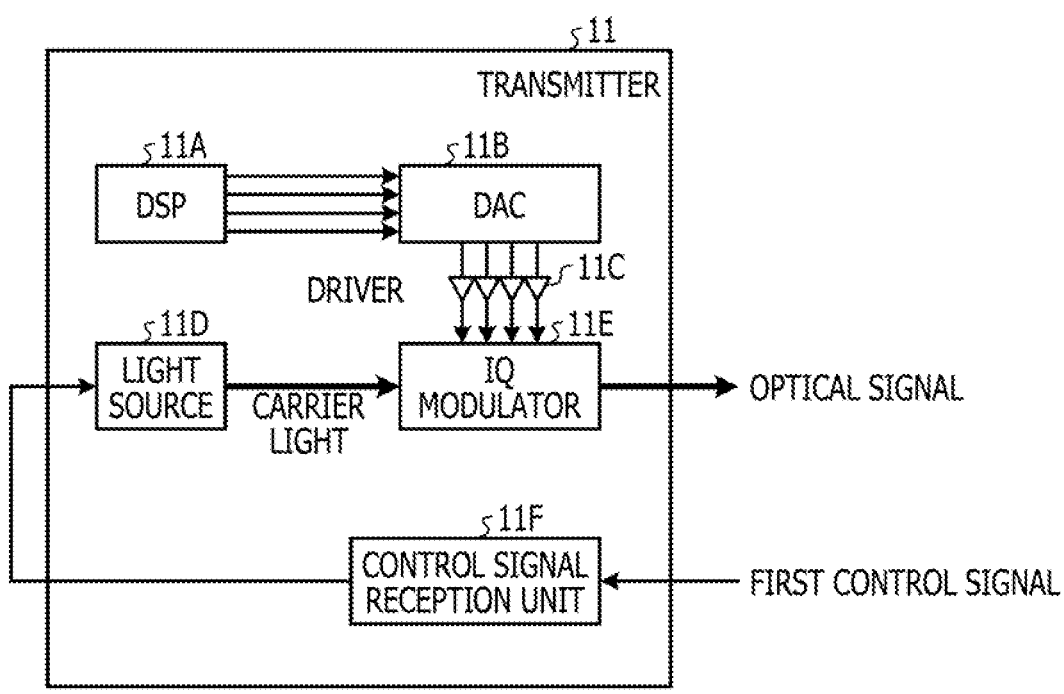
FIG. 5 is an explanatory diagram illustrating one example of a transmitter.

FIG. 5 is an explanatory diagram illustrating one example of the transmitter 11. The transmitter 11 illustrated in FIG. 5 includes a DSP 11A, a DAC 11B, a driver 11C, a light source 11D, an IQ modulator 11E, and a control signal reception unit 11F. DSP 11A is a processing unit that performs signal processing on data signals. The DAC 11B is a conversion device that converts a data signal after signal processing into an analog signal. The driver 11C is a driver that converts an analog signal into a drive voltage. The light source 11D is a laser diode that emits carrier light, which is excitation light. The IQ modulator 11E is, for example, a Mach-Zehnder modulator that optically modulates the carrier light from the light source 11D with the drive voltage from the driver 11C and outputs an optical signal in the C band. The control signal reception unit 11F receives the first control signal from the control device 4 and sets the carrier light to the light source 11D for when an optical signal having a signal wavelength of the CH number assigned to the transmitter 11 in the received first control signal.

Figure 6:
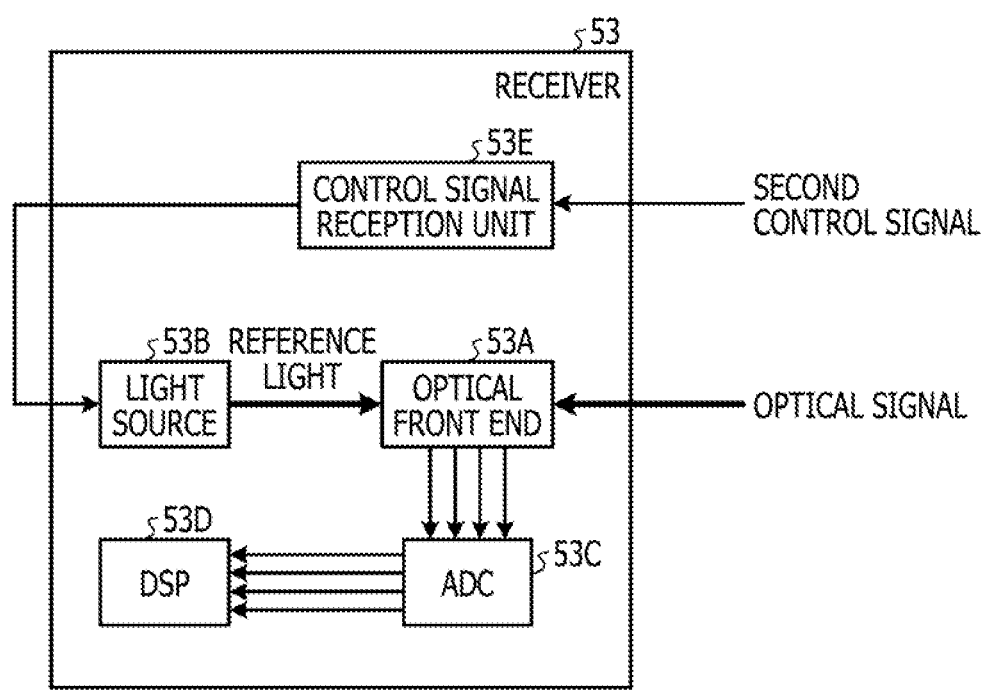
FIG. 6 is an explanatory diagram illustrating one example of a receiver.

FIG. 6 is an explanatory diagram illustrating one example of the receiver 53. The receiver 53 illustrated in FIG. 6 has an optical front end 53A, a light source 53B, an ADC 53C, a DSP 53D, and a control signal reception unit 53E. The light source 53B is a laser diode that emits reference light that is the excitation light. The optical front end 53A receives an optical signal having the signal wavelength of the CH number assigned to the receiver 53 according to the reference light. The ADC 53C digitally converts the signal in the optical signal and outputs the digitally converted data signal to the DSP 53D. The DSP 53D is a processing unit that performs signal processing on a data signal. The control signal reception unit 53E receives the second control signal from the control device 4, and sets to the light source 53B the reference light for when receiving the optical signal having the signal wavelength assigned to the receiver 53 in the received second control signal.

Figure 7:
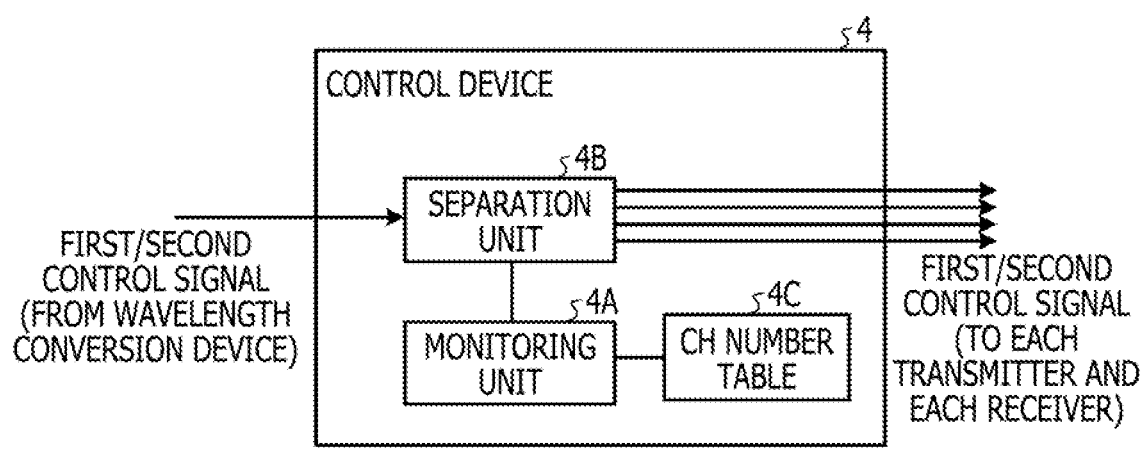
FIG. 7 is an explanatory diagram illustrating one example of a control device.

FIG. 7 is an explanatory diagram illustrating one example of the control device 4. The control device 4 illustrated in FIG. 7 has a monitoring unit 4A, a separation unit 4B, and a CH number table 4C. The CH number table 4C is a table that manages the signal wavelength assigned to each CH number and identification information of the transmitter 11 and the receiver 53. The monitoring unit 4A refers to the CH number table 4C, manages the transmitter 11 and the receiver 53 for each CH number in the wavelength band of the C band, and monitors the transmitter 11 and the receiver 53 in the WDM system 1. When the separation unit 4B receives the control signal from the wavelength conversion device 20, the separation unit 4B separates the control signal into the first control signal or the second control signal. The separation unit 4B separates the signal wavelength for each CH number in the separated first control signal, refers to the CH number table 4C, and transmits the first control signal including the signal wavelength corresponding to the corresponding CH number with respect to the transmitter 11 corresponding to the CH number. Furthermore, the separation unit 4B separates the signal wavelength for each CH number in the separated second control signal, refers to the CH number table 4C, and transmits the second control signal including the signal wavelength corresponding to the corresponding CH number to the receiver 53 corresponding to the CH number.

Figure 8A:
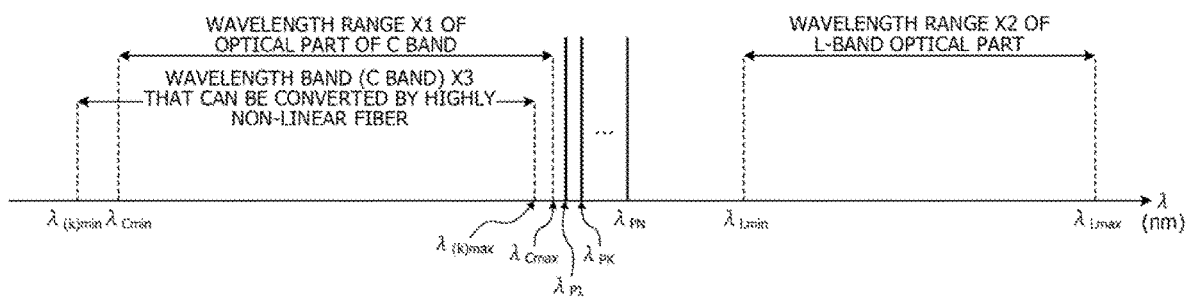
FIG. 8A is explanatory drawing illustrating one example of a wavelength range X1 of a C-band optical part, a wavelength range of an L-band optical part, and a wavelength band X3 of the C band that can be converted by a highly non-linear fiber in a wavelength conversion device 20.

Next, a method of calculating the signal wavelength for each CH number assigned for each zero dispersion wavelength in the first correspondence table 23 in the wavelength conversion device 20 will be described. Note that the wavelength conversion device 20 executes an operation of calculating the signal wavelength for each CH number assigned for each zero dispersion wavelength when installed in the WDM system 1. FIG. 8A is an explanatory diagram illustrating one example of the wavelength range X1 of the C-band optical part, the wavelength range X2 of the L-band optical part, and the wavelength band X3 of the C band that can be converted by the highly non-linear fiber in the wavelength conversion device 20. The zero dispersion wavelength and the excitation light are, for example, $\lambda P1$, $\lambda Pk \ldots \lambda PN$. The wavelength range X1 of the C-band optical part is a first range that is a wavelength band of $\lambda Cmin$ (the shortest wavelength of the C-band optical part) $\leq X1 \leq \lambda Cmax$ (the longest wavelength of the C-band optical part). Note that the C-band optical part is, for example, a transmitter 11 that uses a wavelength band of the C band. The wavelength range X2 of the L-band optical part is a fourth range that is a wavelength band of $\lambda Lmin$ (the shortest wavelength of the L-band optical part) $\leq X2 \leq \lambda Lmax$ (the longest wavelength of the L-band part). Note that the L-band optical part is, for example, an optical part that uses the wavelength band in the L band. The wavelength band X3 of the C band that can be converted by the highly non-linear fiber in the wavelength conversion device 20 is a second range that is a wavelength band of the shortest wavelength λ(k)min≤X3≤the longest wavelength λ(k)max, which can be converted by the excitation light λpk. Note that when the zero dispersion wavelength is λPk, the excitation light wavelength is λPk.

Figure 8B:
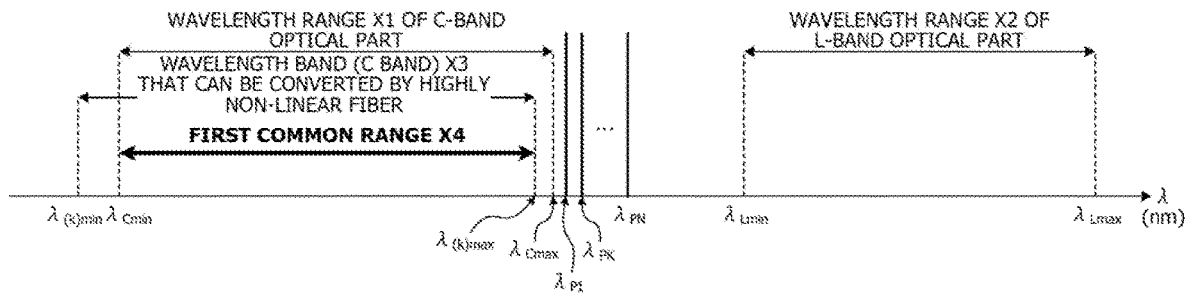
FIG. 8B is an explanatory diagram illustrating one example of a first common range X4 of a C-band optical part.

FIG. 8B is an explanatory diagram illustrating one example of the first common range X4 of the C-band optical part. The first common range X4 illustrated in FIG. 8B is a wavelength band in which the wavelength range X1 of the C-band optical part and the wavelength band X3 of the C band that can be converted by the highly non-linear fiber overlap. The first common range X4 is the wavelength band of the shortest wavelength λCmin≤X4≤the longest wavelength λ(k)max of the C-band optical part. When the zero dispersion wavelength is λpk, the control unit 24 calculates the signal wavelength λ of the first common range X4 by (Equation 1).

$$\lambda'_{(k)min} \leq \lambda \leq \lambda'_{(k)max} \quad (1)$$

Figure 8C:
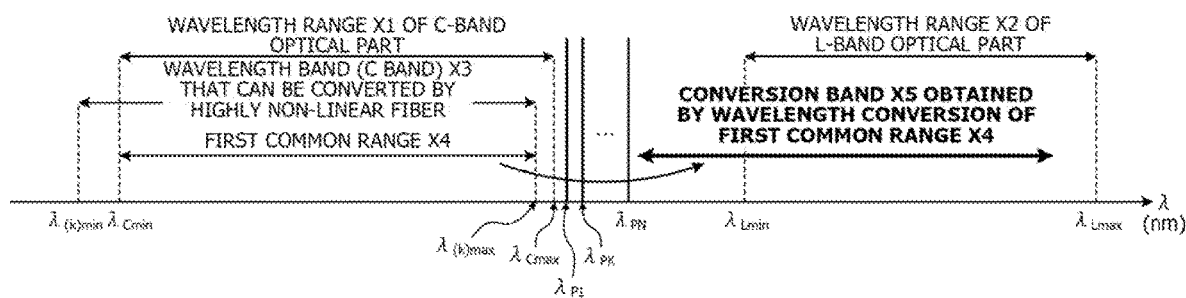
FIG. 8C is an explanatory diagram illustrating one example of a conversion band X5 of the L band after wavelength conversion of the first common range X4.

FIG. 8C is an explanatory diagram illustrating one example of a conversion band X5 in the L band after wavelength conversion of the first common range X4. The conversion band X5 of the L band illustrated in FIG. 8C is the wavelength band of the optical signal of the L band when the optical signal of the first common range X4 is wavelength-converted by the excitation light λPk. When the zero dispersion wavelength is λpk, the control unit 24 calculates the signal wavelength λ in the conversion band X5 of the L band by (Equation 2).

$$C\!\left(\frac{2C}{\lambda_{Pk}} - \frac{C}{\lambda'_{(k)max}}\right) \leq \lambda \leq C\!\left(\frac{2C}{\lambda_{Pk}} - \frac{C}{\lambda'_{(k)min}}\right) \quad (2)$$

Figure 8D:
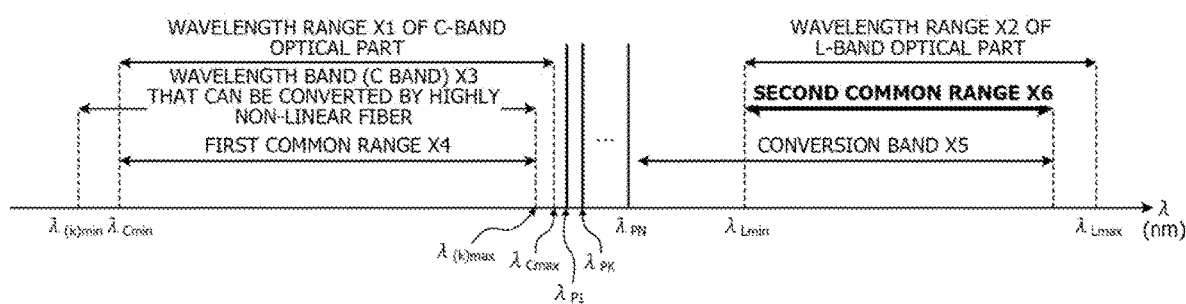
FIG. 8D is an explanatory diagram illustrating one example of a second common range X6 of the L-band optical part.

FIG. 8D is an explanatory diagram illustrating one example of the second common range X6 of the L-band optical part. The second common range X6 illustrated in FIG. 8D is a wavelength band in which the wavelength range X2 of the L-band optical part and the conversion band X5 overlap. When the zero dispersion wavelength is λpk, the control unit 24 calculates the signal wavelength λ of the second common range X6 by (Equation 3).

$$\lambda'_{L(k)min} \leq \lambda \leq \lambda'_{L(k)max} \quad (3)$$

Figure 8E:
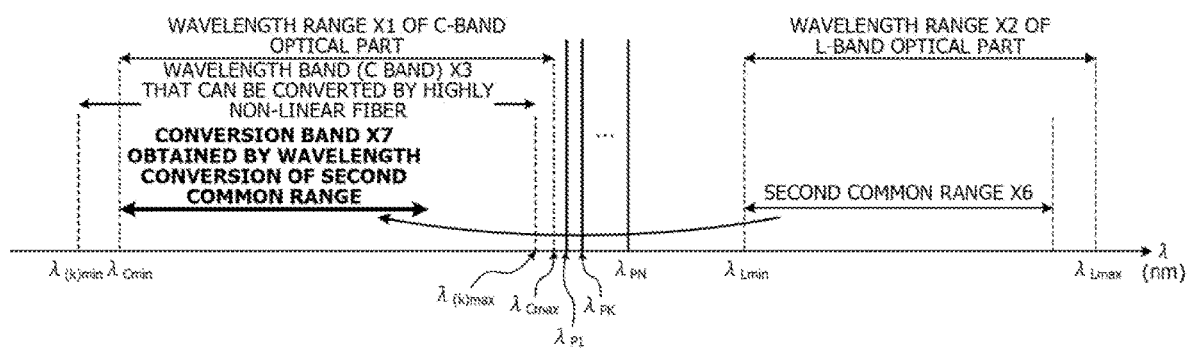
FIG. 8E is an explanatory diagram illustrating one example of a conversion band X7 after wavelength conversion of the second common range X6.

FIG. 8E is an explanatory diagram illustrating one example of a conversion band X7 after wavelength conversion of the second common range X6. The conversion band X7 illustrated in FIG. 8E is the target band of the C band when the signal of the second common range X6 is wavelength-converted by the excitation light λPk. When the zero dispersion wavelength is λpk, the control unit 24 calculates the signal wavelength λ in the conversion band X7 by (Equation 4).

$$C\!\left(\frac{2C}{\lambda_{Pk}} - \frac{C}{\lambda'_{L(k)max}}\right) \leq \lambda \leq C\!\left(\frac{2C}{\lambda_{Pk}} - \frac{C}{\lambda'_{L(k)min}}\right) \quad (4)$$

Consequently, the control unit 24 in the first wavelength conversion device 20A calculates, on the basis of (Equation 1) to (Equation 4) according to the zero dispersion wavelength of the highly non-linear fiber, the target band in which the WDM light in the L band after wavelength conversion fits within the amplified wavelength band of the first optical amplifier 15A, and which is the conversion band X7 of the C band that allows the signal wavelength of each CH number in the WDM light of the C band to fit within. Then, the control unit 24 registers the signal wavelength of the optical signal assigned to the transmitter 11 for each CH number for each zero dispersion wavelength in the first correspondence table 23.

FIG. 9 is a flowchart illustrating one example of processing operation of the WDM system 1 related to distribution processing. The distribution process is, for example, a process operation executed by the first wavelength conversion device 20A, the control device 4, and the transmitter 11. In FIG. 9, the control unit 24 in the first wavelength conversion device 20A extracts the signal wavelength of each CH number corresponding to the zero dispersion wavelength from the first correspondence table 23 (step S11). The generation unit 22 in the first wavelength conversion device 20A generates the first control signal including the signal wavelength of each extracted CH number (step S12). The generation unit 22 transmits the generated first control signal to the control device 4 (step S13). Note that when the wavelength conversion device 20 is the second wavelength conversion device 20B, the generation unit 22 in the second wavelength conversion device 20B extracts the signal wavelength of each CH number corresponding to the zero dispersion wavelength, generates the second control signal including the extracted signal wavelength of each CH number, and transmits the generated second control signal to the control device 4.

When the separation unit 4B in the control device 4 receives the first control signal from the first wavelength conversion device 20A and the second control signal from the second wavelength conversion device 20B, the separation unit 4B separates the first control signal and the second control signal (step S14). When the separation unit 4B obtains the first control signal, the separation unit 4B refers to the CH number table 4C, and transmits, for each CH number, the first control signal including the signal wavelength of this CH number to the transmitter 11 corresponding to this CH number (step S15). Note that when the second control signal is obtained, the separation unit 4B refers to the CH number table 4C, and transmits, for each CH number, the second control signal including the signal wavelength of this CH number to the receiver 53 corresponding to this CH number.

When each transmitter 11 receives the first control signal including the signal wavelength corresponding to its own CH number, each transmitter 11 sets to the light source 11D the carrier light for when transmitting the optical signal having the assigned signal wavelength (step S16). Consequently, each transmitter 11 can output an optical signal in the C band in which the WDM light in the L band after wavelength conversion by the first wavelength conversion device 20A falls within the amplified wavelength band of the first optical amplifier 15A.

Furthermore, when the receiver 53 receives the second control signal including the signal wavelength corresponding to its own CH number, the receiver 53 sets to the light source 53B the reference light for when receiving the optical signal having the assigned signal wavelength. Consequently, each receiver 53 may receive the optical signal having the signal wavelength corresponding to the CH number addressed to itself from the WDM light of the C band after the wavelength conversion by the second wavelength conversion device 20B.

Figure 10A:
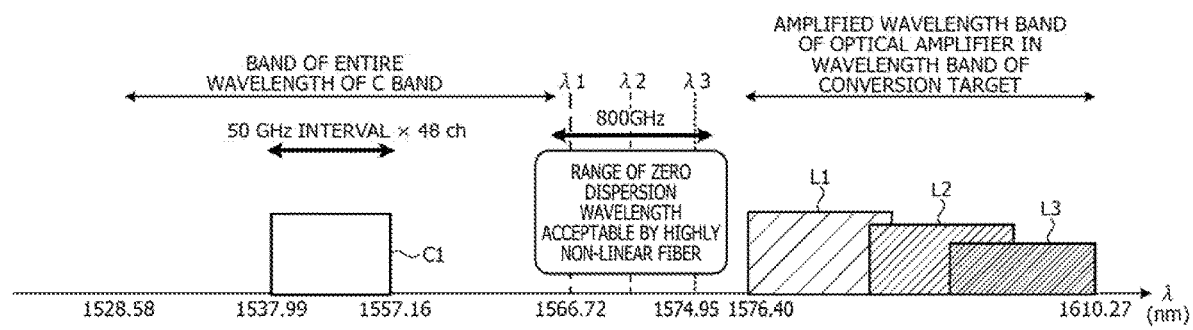
FIG. 10A is an explanatory diagram illustrating one example of a wavelength band of the L band after wavelength conversion for each zero dispersion wavelength of 50 GHz interval×48 ch.

FIG. 10A is an explanatory diagram illustrating one example of the wavelength band of the L band after wavelength conversion for each zero dispersion wavelength of 50 GHz interval×48 ch. The wavelength band of the C band of 50 GHz interval×48 ch is set to, for example, 1537.99 nm to 1557.16 nm, and the zero dispersion wavelength range acceptable for the highly non-linear fiber in the first wavelength conversion device 20A is set to, for example, 800 GHz from 1566.72 nm to 1574.95 nm. The amplified wavelength band of the first optical amplifier 15A in the L band is, for example, 1576.40 nm to 1610.27 nm. The first wavelength conversion device 20A wavelength-converts the wavelength band C1 of the C band of 50 GHz interval×48 ch into the wavelength band L1 of the L band of λ1 within the amplified wavelength band of the first optical amplifier 15A, by using the excitation light of λ1. Furthermore, the first wavelength conversion device 20A wavelength-converts, also by using the excitation light of λ2, the wavelength band C1 of the C band of 50 GHz interval×48 ch into the wavelength band L2 of the L band of λ2 within the amplified wavelength band of the first optical amplifier 15A. Furthermore, the first wavelength conversion device 20A wavelength-converts, by using the excitation light of λ3, the wavelength band C1 of the C band of 50 GHz interval×48 ch into the wavelength band L3 of the L band of λ3 within the amplified wavelength band of the first optical amplifier 15A. Therefore, the first wavelength conversion device 20A may wavelength convert, even by using the excitation light of λ1 to λ3, the wavelength band of the C band of 50 GHz interval×48 ch is the wavelength band of the L band within the amplified wavelength band of the first optical amplifier 15A.

Figure 10B:
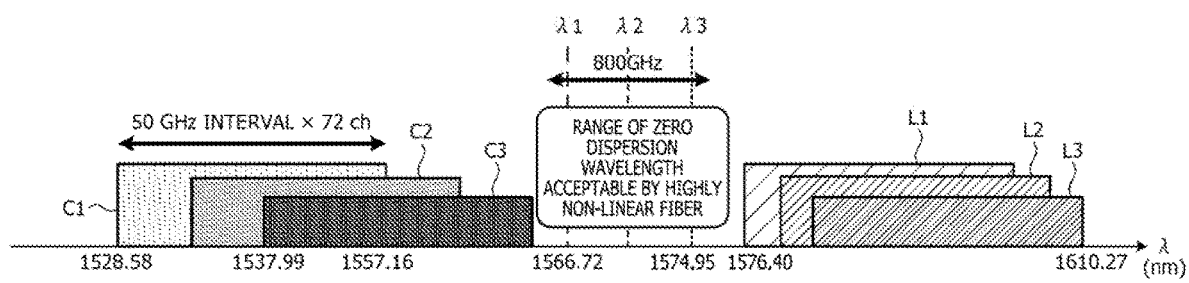
FIG. 10B is an explanatory diagram illustrating one example of the wavelength band of the L band after wavelength conversion for each zero dispersion wavelength of 50 GHz interval×72 ch.

FIG. 10B is an explanatory diagram illustrating one example of the wavelength band of the L band after wavelength conversion for each zero dispersion wavelength of 50 GHz interval×72 ch. The wavelength band of the C band of 50 GHz interval×72 ch is set to, for example, 1528.58 nm to 1562.03 nm, and the zero dispersion wavelength range acceptable for the highly non-linear fiber in the first wavelength conversion device 20A is set to, for example, 800 GHz from 1566.72 nm to 1574.95 nm. The amplified wavelength band of the first optical amplifier 15A in the L band is, for example, 1576.40 nm to 1610.27 nm. When the wavelength band of the C band of 50 GHz interval×72 ch is the first wavelength band C1, the first wavelength conversion device 20A wavelength-converts, by using the excitation light of λ1, the first wavelength band C1 of the C band into the first wavelength band L1 of the L band within the amplified wavelength band of the first optical amplifier 15A in the L band. Furthermore, when the wavelength band of the C band of 50 GHz interval×72 ch is the second wavelength band C2, the first wavelength conversion device 20A wavelength-converts, by using the excitation light of λ2, the second wavelength band C2 of the C band into the second wavelength band L2 of the L band within the amplified wavelength band of the optical amplifier of the L band. When the wavelength band of the C band of 50 GHz interval×72 ch is the third wavelength band C3, the first wavelength conversion device 20A wavelength-converts, by using the excitation light of λ3, the third wavelength band C3 of the C band into the third wavelength band L3 of the L band within the amplified wavelength band of the first optical amplifier 15A in the L band. Consequently, the wavelength bands L1 to L3 of the L band of FIG. 10B is 1.5 times wider than the wavelength bands L1 to L3 in the L band of FIG. 10A, and thus the number of signal wavelengths may be increased while corresponding to characteristics of the first optical amplifier 15A, which is a subsequent part after the wavelength conversion.

Figure 10C:
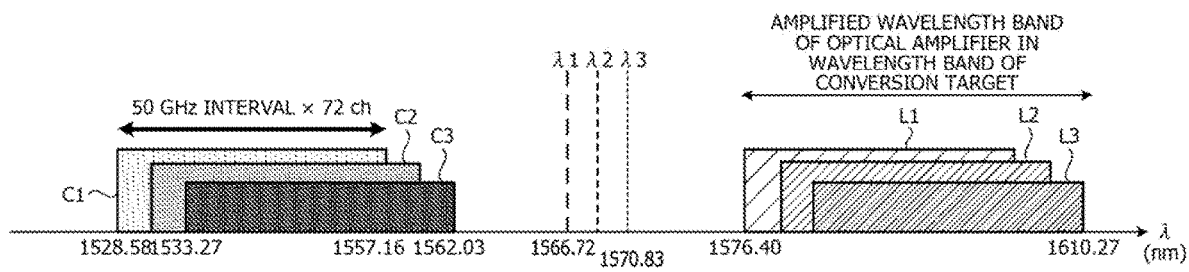
FIG. 10C is an explanatory diagram illustrating one example of the wavelength band of the L band after wavelength conversion for each zero dispersion wavelength of 50 GHz interval×72 ch.

FIG. 10C is an explanatory diagram illustrating one example of the wavelength band of the L band after wavelength conversion for each zero dispersion wavelength of 50 GHz interval×72 ch. The wavelength band of the C band of 50 GHz interval×72 ch is set to, for example, 1528.58 nm to 1562.03 nm, and the zero dispersion wavelength range acceptable for the highly non-linear fiber in the first wavelength conversion device 20A is set to, for example, 800 GHz from 1566.72 nm to 1574.95 nm. The amplified wavelength band of the first optical amplifier 15A in the L band is, for example, 1576.40 nm to 1610.27 nm. When the wavelength band of the C band of 50 GHz interval×72 ch is the first wavelength band C1, the first wavelength conversion device 20A wavelength-converts, by using the excitation light of λ1, the first wavelength band C1 of the C band into the first wavelength band L1 of the L band within the amplified wavelength band of the first optical amplifier 15A in the L band. Furthermore, when the wavelength band of the C band of 50 GHz interval×72 ch is the second wavelength band C2, the first wavelength conversion device 20A wavelength-converts, by using the excitation light of λ2, the second wavelength band C2 of the C band into the second wavelength band L2 of the L band within the amplified wavelength band of the optical amplifier of the L band. When the wavelength band of the C band of 50 GHz interval×72 ch is the third wavelength band C3, the first wavelength conversion device 20A wavelength-converts, by using the excitation light of λ3, the third wavelength band C3 of the C band into the third wavelength band L3 of the L band within the amplified wavelength band of the first optical amplifier 15A in the L band. Consequently, the wavelength bands L1 to L3 of the L band of FIG. 10B is 1.5 times wider than the wavelength bands L1 to L3 in the L band of FIG. 10A, and thus the number of signal wavelengths may be increased while corresponding to characteristics of the first optical amplifier 15A, which is a subsequent part after the wavelength conversion.

In the first wavelength conversion device 20A of the first embodiment, the wavelength band used by the C-band transmitter 11 is shifted according to the zero dispersion wavelength of the highly non-linear fiber, and thus the number of signal wavelengths may be increased while corresponding to characteristics of the first optical amplifier 15A in the L band, which is a subsequent part after the wavelength conversion. Moreover, the number of signal wavelengths may be increased even if the dispersion range of the zero dispersion wavelength is large.

In the first wavelength conversion device 20A, the WDM light in the C band, which is obtained by multiplexing the optical signal in the C band from each transmitter 11 by using the excitation light that matches the zero dispersion wavelength of the highly non-linear fiber, passes through the inside of the highly non-linear fiber, thereby wavelength-converting the WDM light in the C band into the WDM light in the L band. The first wavelength conversion device 20A generates the first control signal that controls each transmitter 11 in the C band to shift the signal wavelength of each optical signal in the WDM light in the C band so that the WDM light in the L band after wavelength conversion falls within the amplified wavelength band of the first optical amplifier 15A in the L band. The first wavelength conversion device 20A transmits the first control signal to each transmitter 11. Consequently, the WDM light in the C band fits within the amplified wavelength band of the first optical amplifier 15A in the L band, and thus the number of signal wavelengths may be increased while corresponding to the characteristics of the first optical amplifier 15A in the L band, which is a subsequent part after wavelength conversion.

The first wavelength conversion device 20A generates the first control signal that sets the carrier light for when the transmitter 11 transmits the optical signal having the assigned signal wavelength to the light source 11D of the transmitter 11. Consequently, each transmitter 11 in the C band may transmit an optical signal having a signal wavelength corresponding to the characteristics of the first optical amplifier 15A in the L band, which is a subsequent part after wavelength conversion by the first wavelength conversion device 20A.

The control unit 24 in the first wavelength conversion device 20A calculates a first common range X4 in which the wavelength range X1 of the C band that can be used by the transmitter 11 and the wavelength range X2 of the C band that can be converted by the highly non-linear fiber overlap. Further, the control unit 24 calculates the second common range X6 in which the conversion band X5 of the L band in a case where the calculated first common range X4 is wavelength-converted with the excitation light of the zero dispersion wavelength of the highly non-linear fiber, and the wavelength range X2 of the L band that can be used by the first optical amplifier 15A overlap. Moreover, the control unit 24 calculates the conversion band X7 of the C band when the calculated second common range X6 is wavelength-converted by the excitation light of the zero dispersion wavelength of the highly non-linear fiber. The control unit 24 registers the signal wavelength of the optical signal of each transmitter 11 in the WDM light of the C band before wavelength conversion in the calculated conversion band X7 of the C band, in the first correspondence table 23 for each zero dispersion wavelength. Consequently, the first wavelength conversion device 20A may easily register the signal wavelength assigned to each transmitter 11 for each zero dispersion wavelength in the first correspondence table 23.

In the second wavelength conversion device 20B, the WDM light in the L band obtained by multiplexing the optical signal in the L band from the first transmission device 2A by using the excitation light that matches the zero dispersion wavelength of the highly non-linear fiber, passes through the inside of the highly non-linear fiber, thereby wavelength-converting the WDM light in the L band is wavelength-converted into the WDM light in the C band. The second wavelength conversion device 20B generates the second control signal that controls each receiver 53 to shift the signal wavelength of the optical signal to be received by each receiver 53 in the WDM light of the C band after wavelength conversion according to the zero dispersion wavelength, and transmits the second control signal to each receiver 53. Consequently, the receiver 53 may receive the optical signal having the signal wavelength to be received from the WDM light in the C band after wavelength conversion.

The second wavelength conversion device 20B generates the second control signal that sets the reference light for when the receiver 53 receives the optical signal having the assigned signal wavelength to the light source 53B of the receiver 53. Consequently, each receiver 53 in the C band may receive the optical signal having the signal wavelength to be received from the WDM light in the C band after wavelength conversion.

Note that in the WDM system 1 of the first embodiment, for example, the case has been illustrated where the first wavelength conversion device 20A transmits the first control signal to the control device 4, and the control device 4 transmits the first control signal to each transmitter 11. However, the present embodiment is not limited to this, and for example, the first control signal from the first wavelength conversion device 20A may be transmitted to the transmitter 11 via the optical multiplexer 12 without passing through the control device 4, and the embodiment thereof will be described below as a second embodiment.

Second Embodiment

Figure 11:
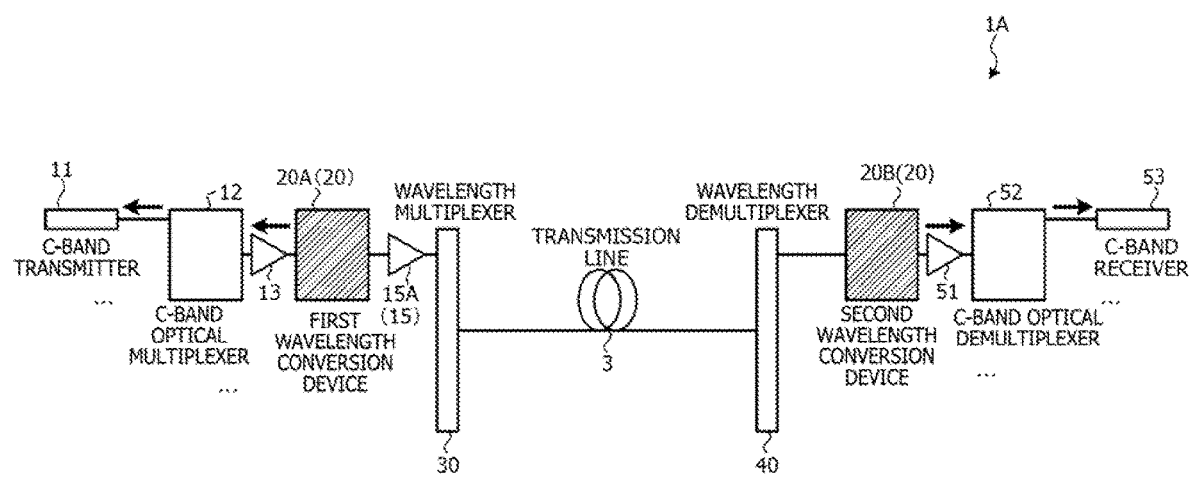
FIG. 11 is an explanatory diagram illustrating one example of a control signal distribution method in the WDM system according to a second embodiment.

FIG. 11 is an explanatory diagram illustrating one example of a method for distributing a control signal in the WDM system 1A of the second embodiment. Note that description of overlapping configurations and operations is omitted by providing the same reference numerals to the same configurations as those of the WDM system 1 of the first embodiment.

The generation unit 22 in the first wavelength conversion device 20A in the first transmission device 2A generates the first control signal including the signal wavelength for each CH number corresponding to the zero dispersion wavelength. The generation unit 22 transmits the generated first control signal to the optical multiplexer 12 in the first transmission device 2A. Moreover, the optical multiplexer 12 transmits the first control signal from the first wavelength conversion device 20A to each transmitter 11. Note that the first control signal is transmitted from the first wavelength conversion device 20A to each transmitter 11 via the optical amplifier 13 and the optical multiplexer 12 using a communication line different from the communication channel. Note that the communication line may transmit the first control signal by using telecommunication or optical communication. Each transmitter 11 extracts the signal wavelength of its own CH number from the received first control signal, and sets the carrier light when transmitting the optical signal corresponding to the signal wavelength of the extracted CH number to the light source 11D. Consequently, each transmitter 11 may transmit an optical signal in the C band using the carrier light corresponding to the signal wavelength of the CH number based on the signal wavelength of its own CH number according to the first control signal. In this case, the control device 4 becomes unnecessary.

The generation unit 22 in the second wavelength conversion device 20B in the second transmission device 2B generates the second control signal including the signal wavelength for each CH number corresponding to the zero dispersion wavelength. The generation unit 22 transmits the generated second control signal to the optical demultiplexer 52 in the second transmission device 2B. Moreover, the optical demultiplexer 52 transmits the second control signal from the second wavelength conversion device 20B to each receiver 53. Note that the second control signal is transmitted from the second wavelength conversion device 20B to each receiver 53 via the optical amplifier 51 and the optical demultiplexer 52 using a communication line. Note that the communication line may transmit the first control signal by using telecommunication or optical communication. Each receiver 53 extracts the signal wavelength of its own CH number from the received second control signal, and sets to the light source 53B the reference light for when receiving the signal wavelength of the extracted CH number. Consequently, the light source 53B in each receiver 53 may receive the optical signal in the C band using the reference light corresponding to the signal wavelength of the CH number based on the signal wavelength of its own CH number according to the second control signal. In this case, the control device 4 becomes unnecessary.

Note that for convenience of explanation, the case where the optical multiplexer 12 transmits the first control signal from the first wavelength conversion device 20A to each transmitter 11, and the optical demultiplexer 52 transmits the second control signal from the second wavelength conversion device 20B to each receiver 53 has been illustrated. However, the optical multiplexer 12 may extract the signal wavelength for each CH number from the first control signal from the first wavelength conversion device 20A, and may individually transmit the first control signal including the extracted signal wavelength for each CH number to the transmitter 11 corresponding to the CH number. Furthermore, the optical demultiplexer 52 may extract the signal wavelength for each CH number from the control signal from the second wavelength conversion device 20B, and may individually transmit the second control signal including the signal wavelength of each CH number to the receiver 53 to corresponding to the CH number.

Figure 12:
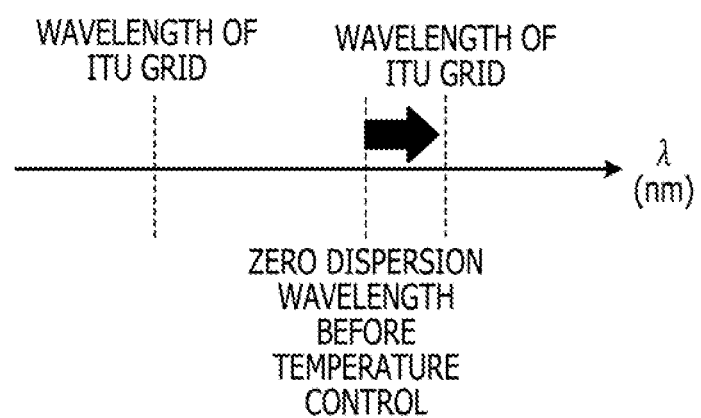
FIG. 12 is an explanatory diagram illustrating one example of matching the zero dispersion wavelength of the highly non-linear fiber with a signal wavelength of an ITU grid.

Furthermore, in the wavelength conversion device 20, it is necessary to match the zero dispersion wavelength of the highly non-linear fiber with the International Telecommunication Union (ITU) grid in operation, and thus the embodiment thereof will be described below as a third embodiment. FIG. 12 is an explanatory diagram illustrating one example of matching the zero dispersion wavelength of the highly non-linear fiber with the signal wavelength of the ITU grid. In the WDM system 1, it is necessary to match the signal wavelength of the optical signal in the C band with the ITU grid in operation. Therefore, as illustrated in FIG. 12, it is necessary to match the zero dispersion wavelength of the highly non-linear fiber in the wavelength conversion device 20 with the signal wavelengths of the preceding and succeeding ITU grid. The ITU grid is a signal wavelength that is operationally determined by the ITU standard.

Third Embodiment

Figure 13:
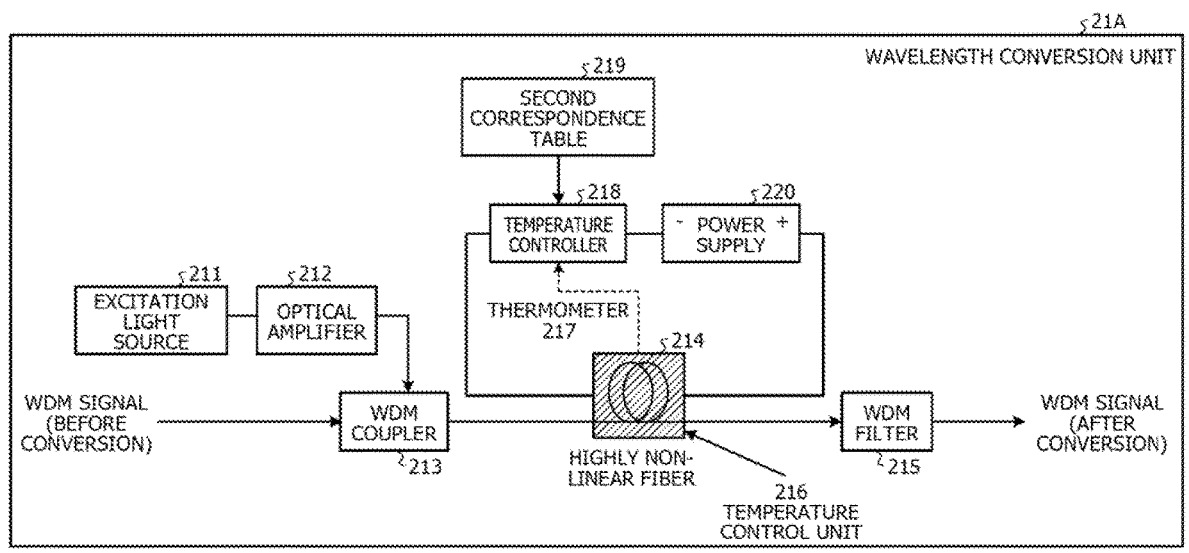
FIG. 13 is an explanatory diagram illustrating one example of a wavelength conversion unit in a wavelength conversion device of a third embodiment.

FIG. 13 is an explanatory diagram illustrating one example of a wavelength conversion unit 21A in the wavelength conversion device 20 of the third embodiment. Note that description of overlapping configurations and operations is omitted by providing the same reference numerals to the same configurations as those of the WDM system 1 of the first embodiment. The wavelength conversion unit 21A in the wavelength conversion device 20 illustrated in FIG. 12 includes an excitation light source 211, an optical amplifier 212, a WDM coupler 213, a highly non-linear fiber 214, a WDM filter 215, a temperature control unit 216, and a thermometer 217. Moreover, the wavelength conversion unit 21A has a temperature controller 218, a second correspondence table 219, and a power supply 220. The excitation light source 211 is a laser diode that emits excitation light. The optical amplifier 212 is an amplifier that optically amplifies the excitation light from the excitation light source 211. The WDM coupler 213 multiplexes the excitation light after optical amplification from the optical amplifier 212 with the WDM light before wavelength conversion. The highly non-linear fiber 214 uses the excitation light to wavelength-convert the WDM light before wavelength conversion into the WDM light after wavelength conversion by passing the excitation light after multiplexing from the WDM coupler 213 and the WDM light before wavelength conversion. Note that the WDM light before wavelength conversion is, for example, WDM light in the C band, and the WDM light after wavelength conversion is, for example, WDM light in the L band. The WDM filter 215 extracts the WDM light after wavelength conversion from the highly non-linear fiber 214 and the WDM light after wavelength conversion from the excitation light, and outputs the extracted WDM light after wavelength conversion.

The temperature control unit 216 is a heater that adjusts the temperature of the highly non-linear fiber 214. Thermometer 217 measures the current temperature of the highly non-linear fiber 214. The temperature controller 218 controls the power supply 220 of the temperature control unit 216 to adjust the current temperature of the highly non-linear fiber 214 from the thermometer 217 to the set temperature. The power supply 220 is a power supply that applies a voltage to the temperature control unit 216. The second correspondence table 219 is, for example, a table that manages the zero dispersion wavelength at the time of 25° C., the set temperature, and the excitation light wavelength at the time of the set temperature in association with each other. FIG. 14 is an explanatory diagram illustrating one example of the second correspondence table 219 that manages the excitation light wavelength at the time of the set temperature for each zero dispersion wavelength at the time of the reference temperature. The second correspondence table 219 illustrated in FIG. 14 manages the excitation light wavelength according to the set temperature for each reference zero dispersion wavelength. As one example, the zero dispersion wavelength at the time of the reference temperature of 25° C. is 1566.4 nm, the set temperature is 35° C., and the excitation light wavelength at the time of the set temperature is 1566.7 nm.

In the temperature controller 218 in the wavelength conversion unit 21A, the power supply 220 is controlled to adjust the temperature control unit 216 that adjusts the current temperature of the highly non-linear fiber 214 to the set temperature in order to match the zero dispersion wavelength of the highly non-linear fiber 214 with the signal wavelength of the ITU grid. The temperature controller 218 controls the power supply 220 to adjust the voltage value applied to the temperature control unit 216. Consequently, the temperature control unit 216 may adjust the temperature according to the voltage value and match the zero dispersion wavelength of the highly non-linear fiber 214 with the signal wavelength of the ITU grid. Note that it is assumed that when matching the zero dispersion wavelength to the signal wavelength of the ITU grid, it is matched to the signal wavelength of the closer ITU grid.

The set temperature is calculated by (Equation 5).

$$\delta T + T = \frac{1}{k}\left(\frac{c}{\lambda} - \frac{c}{\lambda_0}\right) + T \tag{5}$$

Note that the relationship between the zero dispersion wavelength and the temperature is expressed by (Equation 6). It is assumed that the reference temperature is T, the temperature adjustment amount (K) is $\delta T$, the speed of light (m/sec) is c, the zero dispersion wavelength (m) at T (° C.) is $\lambda$, the desired zero dispersion wavelength (m) (=excitation light wavelength) is $\lambda 0$, and the temperature dependence (Hz/K) of zero dispersion wavelength is k.

$$\frac{c}{\lambda_0} = \frac{c}{\lambda} - k\delta T \tag{6}$$

Figure 15:
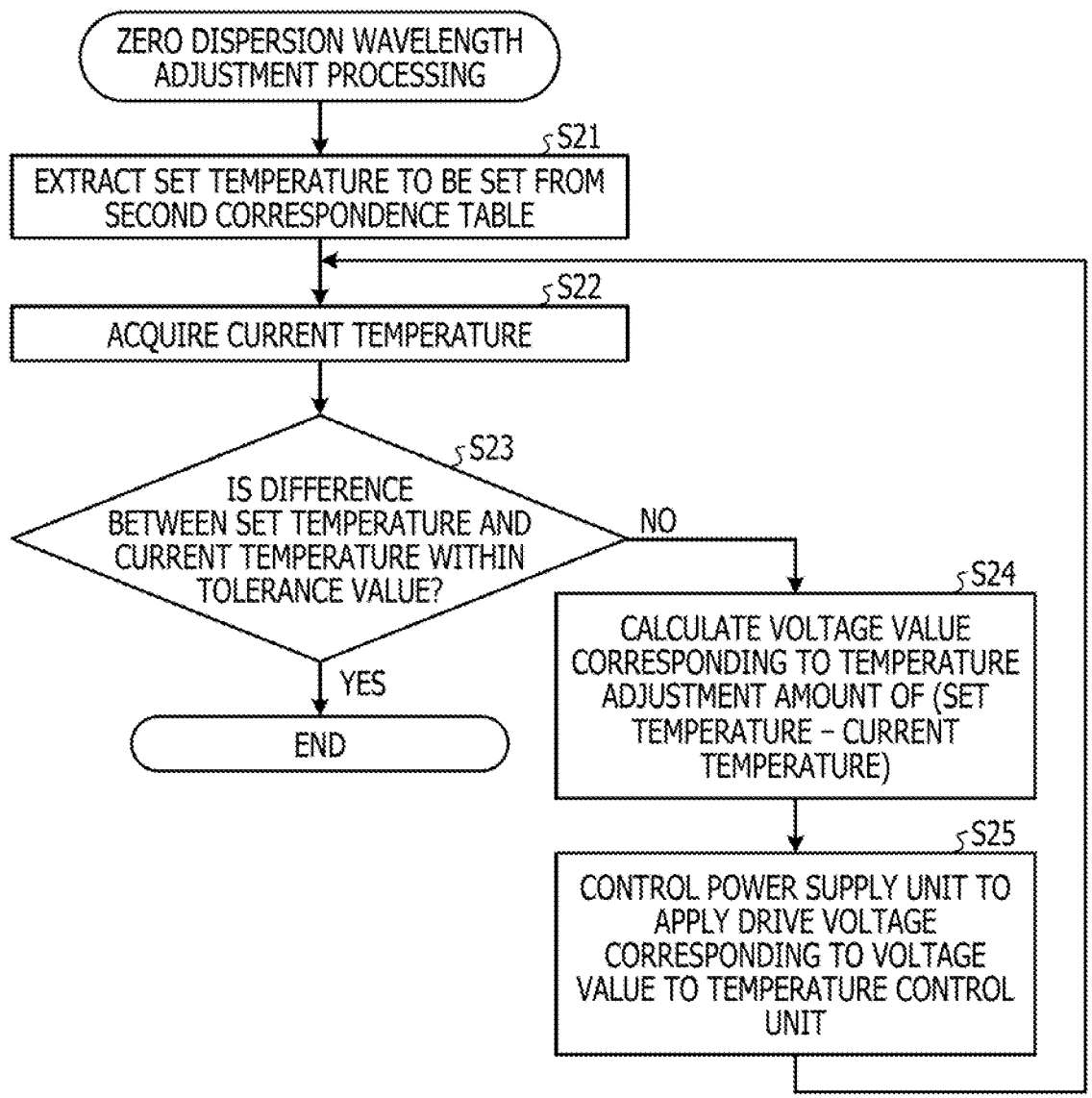
FIG. 15 is a flowchart illustrating one example of processing operation of a temperature controller related to zero dispersion wavelength adjustment processing.

FIG. 15 is a flowchart illustrating one example of the processing operation of the temperature controller 218 related to the zero dispersion wavelength adjustment processing. In FIG. 15, the temperature controller 218 extracts the set temperature corresponding to the zero dispersion wavelength from the second correspondence table 219 (step S21). The temperature controller 218 obtains the current temperature of the highly non-linear fiber 214 from the thermometer 217 (step S22).

The temperature controller 218 determines whether or not the difference between the set temperature and the current temperature is within an acceptable value (step S23). When the difference between the set temperature and the current temperature is within the acceptable value (step S23: Yes), the temperature controller 218 determines that the difference between the zero dispersion wavelength of the highly non-linear fiber 214 and the wavelength of the ITU grid is within the acceptable range, for example, zero, and the dispersion wavelength and the wavelength of the ITU grid match, and terminates the processing operation illustrated in FIG. 15.

When the difference between the set temperature and the current temperature is not within the acceptable value (step S23: No), the temperature controller 218 determines that the difference between the zero dispersion wavelength of the highly non-linear fiber 214 and the wavelength of the ITU grid is out of the acceptable range. When it is determined that the difference between the zero dispersion wavelength of the highly non-linear fiber 214 and the wavelength of the ITU grid is out of the acceptable range, the temperature controller 218 calculates the voltage value based on a temperature adjustment amount of (current temperature–set temperature) (step S24). The temperature controller 218 controls the power supply 220 to apply the drive voltage corresponding to the voltage value calculated in step S24 to the temperature control unit 216 (step S25), and proceeds to step S22 to measure the current temperature. Consequently, the zero dispersion wavelength of the highly non-linear fiber 214 may be matched to the signal wavelength of the ITU grid.

In the wavelength conversion device 20 of the third embodiment, when the difference between the set temperature corresponding to the wavelength of the ITU grid and the current temperature is not within the acceptable value, the voltage value corresponding to the temperature adjustment amount that is the difference between the current temperature and the set temperature is calculated, and a drive voltage corresponding to the voltage value is applied to the temperature control unit 216. Consequently, the wavelength conversion unit 21A may match the zero dispersion wavelength of the highly non-linear fiber with the wavelength of the ITU grid. The wavelength conversion device 20 may secure the zero dispersion wavelength applied to the ITU grid.

Note that in the WDM system 1 of the first embodiment, the case has been illustrated in which the excitation light (carrier light) set in the first wavelength conversion device 20A in the first transmission device 2A and the excitation light (reference light) set in the second wavelength conversion device 20B in the second transmission device 2B are set individually. However, the excitation light set in the wavelength conversion device 20 in the first transmission device 2A and the excitation light set in the wavelength conversion device 20 in the second transmission device 2B may be set to be the same, and an embodiment of this will be described as a fourth embodiment.

Fourth Embodiment

Figure 16:
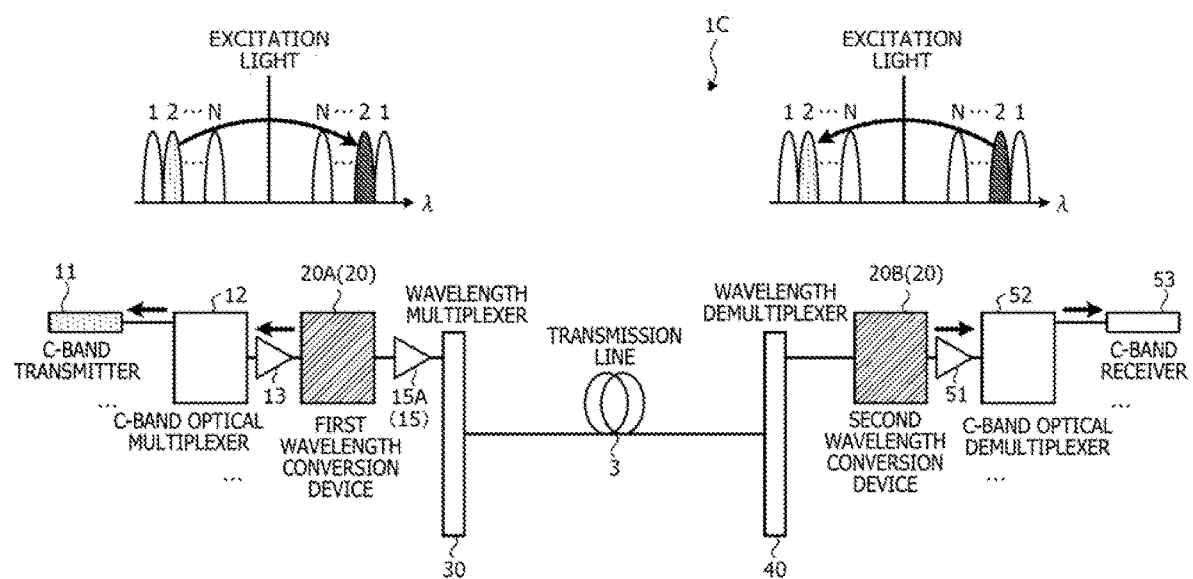
FIG. 16 is an explanatory diagram illustrating one example of a WDM system of a fourth embodiment.

FIG. 16 is an explanatory diagram illustrating one example of a WDM system 1C of the fourth embodiment. In order to align the signal wavelength of the transmitter 11 of the CH number in the first transmission device 2A with the signal wavelength of the receiver 53 of the same CH number in the second transmission device 2B, the excitation light of the first wavelength conversion device 20A and the excitation light of the second wavelength conversion device 20B are set to be the same. For example, the signal wavelength on the transmitting side of the transmitter 11 of Tx-11 and the signal wavelength on the receiving side of the receiver 53 of Rx-11 are the same, and the signal wavelength on the transmitting side of the transmitter 11 of Tx-12 and the signal wavelength on the receiving side of the receiver 53 of Rx-12 are the same.

In the WDM system 1 of the fourth embodiment, in order to pair the transmitter 11 and the receiver 53 to align the signal wavelength on the transmitting side and the signal wavelength on the receiving side, the zero dispersion wavelength of the highly non-linear fiber of the first wavelength conversion device 20A and the zero dispersion wavelength of the highly non-linear fiber of the second wavelength conversion device 20B are made the same. Then, the excitation light of the first wavelength conversion device 20A and the excitation light of the second wavelength conversion device 20B are made to have the same wavelengths. Consequently, the signal wavelengths of the transmitter 11 and the receiver 53 may be aligned.

Note that an embodiment in a case where the optical multiplexer 12 in the first transmission device 2A and the optical demultiplexer 52 in the second transmission device 2B of the first embodiment are achieved by arrayed waveguide grating (AWG) will be described below as a fifth embodiment.

Fifth Embodiment

Figure 17:
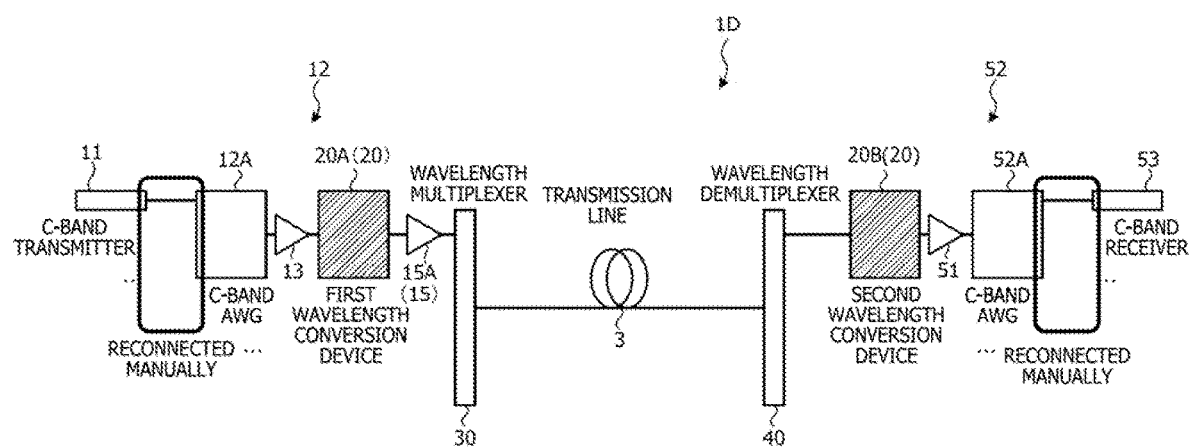
FIG. 17 is an explanatory diagram illustrating one example of a WDM system of a fifth embodiment.

FIG. 17 is an explanatory diagram illustrating one example of a WDM system 1D of the fifth embodiment. The optical multiplexer 12 in the first transmission device 2A is composed of the AWG 12A. The AWG 12A has a plurality of connection ports and cannot switch the signal wavelength that can be transmitted by each port, and thus this configuration can be achieved by manually connecting each transmitter 11. Furthermore, the optical demultiplexer 52 in the second transmission device 2B is composed of AWG 52A. Since the AWG 52A cannot switch the signal wavelength that can be transmitted by each port, this configuration can be achieved by manually connecting each receiver 53.

Note that in the WDM system 1D of the fifth embodiment 5, the case where the optical multiplexer 12 is configured by AWG 12A and the optical demultiplexer 52 is configured by AWG 52A has been illustrated. However, since the connection is performed manually when connecting the AWG 12A and the transmitter 11 or when connecting the AWG 52A and the receiver 53, the connection work is burdensome. Therefore, an embodiment of a WDM system 1E that may reduce the burden of such connection work will be described below as a sixth embodiment.

Sixth Embodiment

Figure 18:
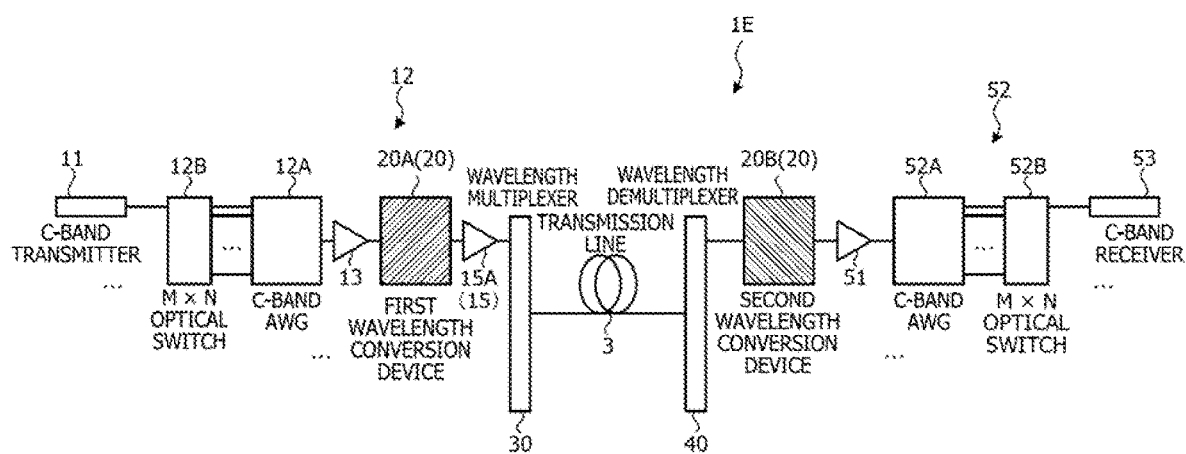
FIG. 18 is an explanatory diagram illustrating one example of a WDM system of a sixth embodiment.

FIG. 18 is an explanatory diagram illustrating one example of the WDM system 1E of the sixth embodiment. The optical multiplexer 12 in the first transmission device 2A has an AWG 12A and an optical switch 12B. The optical switch 12B has a plurality of ports between the transmitter 11 and the AWG 12A and automatically switches the signal wavelength that can be transmitted through each port, and thus may automatically make an optical connection between each transmitter 11 and the AWG 12A.

The optical demultiplexer 52 in the second transmission device 2B also has an AWG 52A and an optical switch 52B. The optical switch 52B has a plurality of ports between the receiver 53 and the AWG 52A and automatically switches the signal wavelength that can be transmitted through each port, and thus may automatically make an optical connection between each receiver 53 and the AWG 52A.

Consequently, since the optical multiplexer 12 incorporates the optical switch 12B, the connection work for optical connection between the optical switch 12B and each transmitter 11 is unnecessary. Furthermore, since the optical demultiplexer 52 incorporates the optical switch 52B, the connection work when connecting the optical switch 52B and each receiver 53 is unnecessary.

Note that in the WDM system 1D of the fifth embodiment, the case where the optical multiplexer 12 and the optical demultiplexer 52 are configured by the AWG has been illustrated, but the optical multiplexer 12 and the optical demultiplexer 52 may be composed of a wavelength selective switch (WSS), and the embodiment thereof will be described below as a seventh embodiment.

Seventh Embodiment

Figure 19:
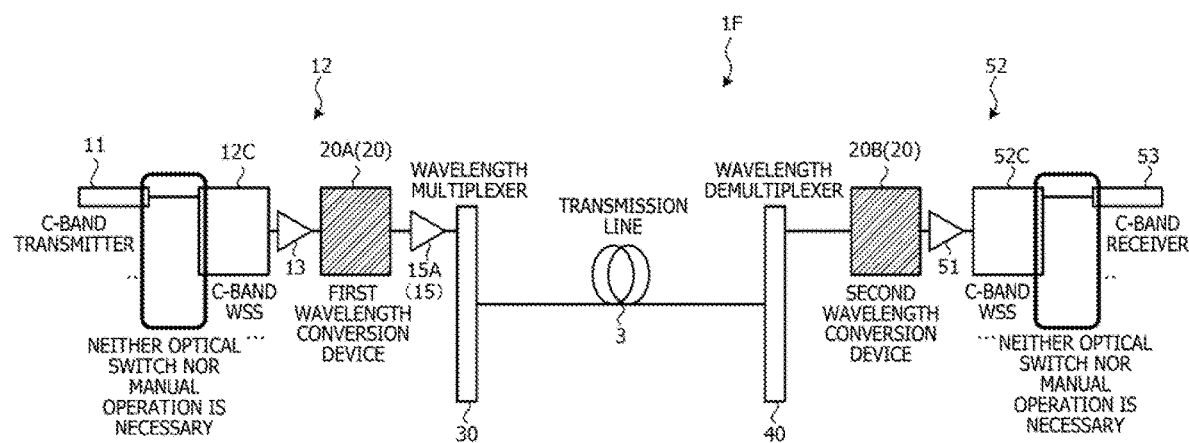
FIG. 19 is an explanatory diagram illustrating one example of a WDM system of a seventh embodiment.
Figure 20:
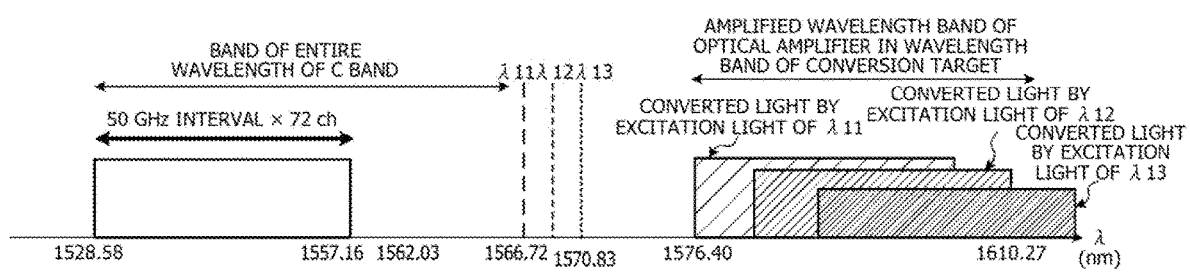
FIG. 20 is an explanatory diagram illustrating one example of wavelength conversion of the wavelength band of the C-band optical part to the wavelength band of the L-band optical part for each excitation light.

FIG. 19 is an explanatory diagram illustrating one example of the WDM system 1F of the seventh embodiment. The optical multiplexer 12 in the first transmission device 2A is composed of a WSS 12C. The WSS 12C automatically switches the signal wavelength that can be transmitted, and thus may automatically make an optical connection between each transmitter 11 and the optical amplifier 13. The WSS 12C outputs WDM light obtained by multiplexing optical signals from the respective transmitters 11 to the optical amplifier 13.

The optical demultiplexer 52 in the second transmission device 2B is composed of a WSS 52C. The WSS 52C automatically switches the signal wavelength that can be transmitted, and thus may automatically make an optical connection between the optical amplifier 51 and each receiver 53. The WSS 52C outputs an optical signal obtained by demultiplexing the WDM light after optical amplification from the optical amplifier 51 to each receiver 53.

Consequently, since the optical multiplexer 12 is composed of the WSS 12C, the signal wavelength that can be transmitted through each port is automatically switched by the WSS 12C, and thus the connection work for each transmitter 11 is unnecessary without the need for an optical switch. Since the optical demultiplexer 52 is composed of WSS 52C, the signal wavelength that can be transmitted through each port by the WSS 52C is automatically switched, and thus the connection work for each receiver 53 is unnecessary without the need for an optical switch.

Note that the case has been illustrated where the first wavelength conversion device 20A in the first transmission device 2A of the present embodiment multiplexes the optical signals from the respective transmitters 11 and wavelength-converts the WDM light in the C band into the WDM light in the L band. However, the first transmission device 2A may incorporate a first reception group 50A and a second wavelength conversion device 20B that wavelength-converts of WDM light in the L band into WDM light in the C band, and may be appropriately changed.

Furthermore, the case where, although the first wavelength conversion device 20A wavelength-converts the WDM light in the C band to the WDM light in the L band has been illustrated, the WDM light in the L band may be wavelength-converted to the WDM light in the C band, and may be appropriate changed.

In this embodiment, the highly non-linear fiber is exemplified as the wavelength conversion medium, but for example, a wavelength conversion medium such as a waveguide device may be used, and the wavelength conversion medium may be appropriately changed.

In this embodiment, the case where it is applied to the first wavelength conversion device 20A that wavelength-converts the C band WDM light into the L band WDM light has been illustrated, but it is also applicable to the third wavelength conversion device 20C that wavelength-converts the C band WDM light to the S band WDM light. The third wavelength conversion device 20C generates the first control signal that controls each transmitter 11 in the C band to shift the signal wavelength of the optical signal in the WDM light in the C band into the amplified wavelength band of the second optical amplifier 15B in the S band. The third wavelength conversion device 20C transmits the first control signal to each transmitter 11. Consequently, the WDM light in the C band fits within the amplified wavelength band of the second optical amplifier 15B in the S band, so that the number of signal wavelengths may be increased while corresponding to the second optical amplifier 15B in the S band, which is a subsequent part after wavelength conversion.

In this embodiment, the case where it is applied to the second wavelength conversion device 20B that wavelength-converts the WDM light in the L band into the WDM light in the C band has been illustrated, but it is also applicable to the fourth wavelength conversion device 20D that wavelength-converts the WDM light in the S band into the WDM light in the C band. The fourth wavelength conversion device 20D uses excitation light that matches the zero dispersion wavelength of the highly non-linear fiber, and the S-band WDM light that multiplexes the optical signal in the S band from the first transmission device 2A is highly non-linear. By passing through the inside of the highly non-linear fiber, S-band WDM light is wavelength-converted into C-band WDM light. The fourth wavelength conversion device 20D generates the second control signal to control each receiver 53 to shift the signal wavelength of the optical signal to be received by each receiver 53 in the WDM light in the C band after wavelength conversion according to the zero dispersion wavelength, and transmits the second control signal to each receiver 53. Consequently, the receiver 53 may receive the optical signal having the signal wavelength to be received from the WDM light in the C band after wavelength conversion.

Furthermore, in this embodiment, for example, a wavelength conversion device 20 that wavelength-converts WDM light in the C band into WDM light in the L band has been illustrated. However, the present embodiment is not limited to the WDM light, and may be applied to a wavelength conversion device that wavelength-converts an optical signal in the C band into an optical signal in the L band, and may be appropriately changed. Note that for convenience of explanation, the C band is used as a reference, but it may be applied to a transmission system in a case where wavelength conversion is performed between the S band and the L band, from the S band to the L band and from the L band to the S band, and may be appropriately changed.

In the wavelength conversion device 20 of the present embodiment, although the amplified wavelength band of the optical amplifier 15 is exemplified as the subsequent part characteristic after the wavelength conversion, for example, the amplified wavelength band of the optical amplifier in the wavelength multiplexer 30 or an in-line amplifier or the like in a relay device on the transmission line 3 may be used, and may be appropriately changed.

Moreover, in the wavelength conversion device 20, the amplified wavelength band of the optical amplifier 15 is exemplified as the subsequent part characteristic after the wavelength conversion, but part characteristics of the wavelength multiplexer 30, the wavelength demultiplexer 40, and the optical fiber or a relay device on the transmission line 3, and the like may be used as the subsequent optical part, and may be appropriately changed.

In the embodiments described above, the system that wavelength-converts the C-band WDM light into S-band or L-band light and transmits the converted light to the transmission line 3 by using the C-band optical parts have been described. However, the present embodiments are also applicable to a system that wavelength-converts S-band WDM light into C-band or L-band light and transmits the converted light to the transmission line 3 by using the S-band optical parts, or a system that converts L-band WDM light into C-band or S-band light and transmits the converted light to the transmission line 3 by using the L-band optical parts.

In the embodiment described above, the case where the C band, the L band and the S band are used is illustrated, but the embodiments are not limited to the C band, the L band and the S band, and may be applied to, for example, the O band, the E band and the U band, and may be changed as appropriate.

In the embodiment described above, the case where the transmitter 11 and the receiver 53 are separated has been illustrated, but a communication device having the functions of the transmitter 11 and the receiver 53 may be used. In this case, the optical multiplexer 12 is an optical multiplexer-demultiplexer, the optical amplifier 13 is a bidirectional optical amplifier, the wavelength conversion device 20 is a bidirectional wavelength conversion device, the optical amplifier 15 is a bidirectional optical amplifier, and the wavelength multiplexer 30 is a wavelength multiplexer-demultiplexer. Moreover, the wavelength demultiplexer 40 is a wavelength multiplexer-demultiplexer, the optical amplifier 51 is also a bidirectional optical amplifier, and the optical demultiplexer 52 is an optical multiplexer-demultiplexer. Then, in the case of a communication device, the first control signal or the second control signal may be transmitted using an OSC such as a control channel different from the communication channel.

The generation unit 22 in the first wavelength conversion device 20A of the first embodiment described above, for example, extracts a signal wavelength for each CH number corresponding to the zero dispersion wavelength from the first correspondence table 23, and generates the first control signal that includes each of the extracted CH numbers. However, the generation unit 22 may, for example, extract the wavelength range of the C band corresponding to the zero dispersion wavelength from the table illustrated in FIG. 4A and generate the first control signal including the extracted wavelength range of the C band.

Furthermore, each of the components of each the units illustrated in the drawings does not necessarily need to be physically configured as illustrated in the drawings. For example, specific forms of separation and integration of the respective units are not limited to the illustrated forms, and all or some of the units may be functionally or physically separated and integrated in any unit according to various loads, use situations, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength conversion device comprising:
a first wavelength conversion circuit that wavelength-converts, by passing a first multiplex light obtained by multiplexing an optical signal of a first wavelength band from each transmitter of a plurality of transmitters through an inside of a wavelength conversion medium by using excitation light, the first multiplex light into a second multiplex light in a second wavelength band different from the first wavelength band; and
a first generation circuit that generates, using calculations that are based on an amplified wavelength band of a downstream optical amplifier that optically amplifies the second multiplex light, a first control signal to control each transmitter of the plurality of transmitters to shift a signal wavelength of each optical signal in the first multiplex light before wavelength conversion so that the second multiplex light after wavelength conversion fits within the amplified wavelength band of the downstream optical amplifier, and transmits the first control signal to each transmitter of the plurality of transmitters.

2. The wavelength conversion device according to claim 1, wherein the first wavelength conversion circuit wavelength-converts the first multiplex light into the second multiplex light by using the excitation light that matches a zero dispersion wavelength of the wavelength conversion medium.

3. The wavelength conversion device according to claim 1, wherein the first generation circuit generates the first control signal to set a carrier light of a light source of each transmitter of the plurality of transmitters so that the second multiplex light after wavelength conversion fits within the amplified wavelength band of the downstream optical amplifier.

4. The wavelength conversion device according to claim 1, further comprising:
a storage area that is assigned to the each transmitter of the plurality of transmitters for each zero dispersion wavelength of a plurality of zero dispersion wavelengths of the wavelength conversion medium and stores the signal wavelength of each optical signal in the first multiplex light before the wavelength conversion,
wherein the first generation circuit extracts signal wavelengths of the plurality of transmitters according to a zero dispersion wavelength of the wavelength conversion medium from the storage area, and generates the first control signal in accordance with the extracted signal wavelengths to set a carrier light of a light source of each transmitter of the plurality of transmitters.

5. The wavelength conversion device according to claim 4, further comprising:
a control circuit that calculates a first common range in which a first range of the first wavelength band that is usable by each transmitter of the plurality of transmitters and a second range of the first wavelength band that is capable of being converted with a wavelength conversion medium overlap, calculates a second common range in which a third range of the second wavelength band in a case where the calculated first common range is wavelength-converted with excitation light of a zero dispersion wavelength of the wavelength conversion medium and a fourth range of the second wavelength band that is usable by an optical amplifier overlap, and calculates a fifth range of the first wavelength band in a case where the calculated second common range is wavelength-converted with excitation light of a zero dispersion wavelength of the wavelength conversion medium, wherein the control circuit stores the signal wavelength assigned to each transmitter of the plurality of transmitters for each zero dispersion wavelength of the plurality of zero dispersion wavelengths in the storage area, to shift the signal wavelength of each optical signal in the first multiplex light before wavelength conversion into the fifth range.

6. The wavelength conversion device according to claim 1, further comprising:

a second wavelength conversion circuit that wavelength-converts, by passing the second multiplex light from an opposing device through an inside of a wavelength conversion medium of the second wavelength conversion circuit, the second multiplex light into the first multiplex light by using excitation light that matches a zero dispersion wavelength of the wavelength conversion medium of the second wavelength conversion circuit; and a second generation circuit that generates a second control signal that controls each receiver of a plurality of receivers to shift a signal wavelength of an optical signal to be received by each receiver in the first multiplex light after wavelength conversion according to the zero dispersion wavelength, and transmits the second control signal to each receiver of the plurality of receivers.

7. The wavelength conversion device according to claim 6, wherein the second generation circuit generates the second control signal to set, for each receiver of the plurality of receivers, a reference light emitted by a light source of the receiver so as to shift the signal wavelength of the optical signal received by the receiver.

8. The wavelength conversion device according to claim 1, further comprising:

a temperature control circuit that adjusts a current temperature of a highly non-linear fiber that is the wavelength conversion medium; and a temperature controller that controls the temperature control circuit based on a difference temperature when a difference temperature between a current temperature of the highly non-linear fiber and a set temperature is not within an acceptable value.

9. A transmission device comprising:
a plurality of transmitters; and
a wavelength conversion device that wavelength-converts, by passing a first multiplex light obtained by multiplexing an optical signal of a first wavelength band from each transmitter of the plurality of transmitters through an inside of a wavelength conversion medium by using excitation light, the first multiplex light into a second multiplex light in a second wavelength band different from the first wavelength band, wherein the wavelength conversion device includes a generation circuit that generates, using calculations that are based on an amplified wavelength band of a downstream optical amplifier that optically amplifies the second multiplex light, a control signal that controls each transmitter of the plurality of transmitters to shift a signal wavelength of each optical signal in the first multiplex light before the wavelength conversion so that the second multiplex light after the wavelength conversion fits within the amplified wavelength band of the downstream optical amplifier, and transmits the control signal to each transmitter, and each transmitter of the plurality of transmitters shifts a signal wavelength of an optical signal transmitted by the transmitter according to the control signal.

10. A transmission system comprising:
a first transmission device; and
a second transmission device, wherein
the first transmission device includes a plurality of transmitters and a first wavelength conversion device that wavelength-converts, by passing first multiplex light obtained by multiplexing an optical signal of a first wavelength band from each transmitter of a plurality of transmitters through an inside of a wavelength conversion medium of the first wavelength conversion device, the first multiplex light into a second multiplex light of a second wavelength band different from the first wavelength band by using excitation light that matches a zero dispersion wavelength of the wavelength conversion medium, the second transmission device includes a second wavelength conversion device that converts, by passing the second multiplex light from the first transmission device through the inside of a wavelength conversion medium of the second wavelength conversion device, the second multiplex light into the first multiplex light by using an excitation light that matches a zero dispersion wavelength of the wavelength conversion medium of the second wavelength conversion device, and a plurality of receivers that receive an optical signal to be received in the first multiplex light after wavelength-conversion by the second wavelength conversion device, the first wavelength conversion device includes a first generation circuit that generates, using calculations that are based on an amplified wavelength band of a downstream optical amplifier that optically amplifies the second multiplex light, a first control signal that controls each transmitter of the plurality of transmitters to shift a signal wavelength of each optical signal in the first multiplex light before wavelength conversion so that the second multiplex light after wavelength conversion fits within the amplified wavelength band of the downstream optical amplifier, and transmits the first control signal to each transmitter of the plurality of transmitters, each transmitter of the plurality of transmitters includes a first light source that emits carrier light that shifts a signal wavelength of the optical signal transmitted by the transmitter according to the first control signal from the first generation circuit, the second wavelength conversion device includes a second generation circuit that generates a second control signal that controls each receiver of a plurality of receivers to shift a signal wavelength of an optical signal to be received by the receiver in the first multiplex light after wavelength conversion according to the zero dispersion wavelength of the wavelength conversion medium of the second wavelength conversion device, and transmits the second control signal to each receiver of the plurality of receivers, and each receiver of the plurality of receivers includes a second light source that emits reference light that shifts the signal wavelength of the optical signal received by the receiver according to the second control signal from the second generation circuit.

11. The transmission system according to claim 10, wherein the zero dispersion wavelength of the wavelength conversion medium of the first wavelength conversion device and the zero dispersion wavelength of the wavelength conversion medium of the second wavelength conversion device are made the same.

* * * * *